(12) United States Patent
Wang et al.

(10) Patent No.: US 9,466,096 B2
(45) Date of Patent: Oct. 11, 2016

(54) DEBLURRING IMAGES HAVING SPATIALLY VARYING BLUR

(71) Applicant: ADOBE SYSTEMS INCORPORATED, San Jose, CA (US)

(72) Inventors: Jue Wang, Kenmore, WA (US); Sunghyun Cho, Seattle, WA (US); Jen-Chan Chien, Saratoga, CA (US); Dong Feng, Beijing (CN)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 14/937,395

(22) Filed: Nov. 10, 2015

(65) Prior Publication Data
US 2016/0063687 A1 Mar. 3, 2016

Related U.S. Application Data

(63) Continuation of application No. 14/061,068, filed on Oct. 23, 2013, now Pat. No. 9,208,543.

(51) Int. Cl.
| G06K 9/40 | (2006.01) |
| G06T 5/00 | (2006.01) |
| G06T 5/20 | (2006.01) |
| G06T 7/00 | (2006.01) |

(52) U.S. Cl.
CPC ............. *G06T 5/003* (2013.01); *G06T 5/20* (2013.01); *G06T 7/0081* (2013.01); *G06T 2207/10004* (2013.01); *G06T 2207/20012* (2013.01)

(58) Field of Classification Search
CPC ......... G06T 5/001; G06T 5/20; G06T 5/002; G06T 5/003; G06T 5/004; G06K 9/40; H04N 7/26888; H04N 1/4097; H04N 5/23212; H04N 5/23248; H04N 5/23254; H04N 5/23258
See application file for complete search history.

(56) References Cited

U.S. PATENT DOCUMENTS

2013/0243319 A1* 9/2013 Cho .................... G06T 5/003
382/168

OTHER PUBLICATIONS

Cho, Sunghyun, et al., "Fast Motion Deblurring", ACM Transactions on Graphics Proceedings of SIGGRAPH ASIA 28, 5, (2009), 8 pgs.
Fergus, Rob, et al., "Removing Camera Shake from a Single Photograph", SIGGRAPH ACM, [Online]. Retrieved from the Internet: <URL:http://cs.nyu.edu/-fergus/papers/deblur_fergus. pdf>, (2006), 787-794.

(Continued)

*Primary Examiner* — Duy M Dang
(74) *Attorney, Agent, or Firm* — Shook, Hardy & Bacon, L.L.P.

(57) ABSTRACT

A computer-implemented method and system are described for deblurring an image. The method may include accessing an image having a first blurred region and a second blurred region, and generating a first blur kernel for the first blurred region and a second blur kernel for the second blurred region. Thereafter, the first blur kernel is positioned with respect to the first blurred region, and the second blur kernel is positioned with respect to the second blurred region based on the position of the first blur kernel. The image is then deblurred by deconvolving the first blurred region with the first blur kernel, and deconvolving the second blurred region with the second blur kernel.

20 Claims, 27 Drawing Sheets

(56) References Cited

OTHER PUBLICATIONS

Hirsch, Michael, et al., "Fast Removal of Non-uniform Camera Shake", Proc. IEEE International Conference on Computer Vision, [Online}. Retrieved from the Internet: URL: http://webdav.is.mpg.de/pixel/fast_removal_of_camera_shake, (2011 ), 8 pgs.

Osher, Stanley, et al., "Feature-Oriented Image Enhancement Using Shock Filters", SIAM Journal on Numerical Analysis, vol. 27, No. 4, [Online]. Retrieved from the Internet: URL: http://www.jstor.org/stable/2157689. Accessed: Sep. 30, 2013, (1990), 919-940.

Shan, Qi, et al., "High-quality Motion Deblurring from a Single Image", ACM Transactions on Graphics (TOG) Proceedings of ACM SIGGRAPH, vol. 27 Issue 3, Article No. 73, (2008), 1-10.

Whyte, Oliver, et al., "Non-uniform Deblurring for Shaken Images", Proceedings of the IEEE Conference on Computer Vision and Pattern Recognition, (2010), 8 pgs.

Xu, Li, et al., "Two-Phase Kernel Estimation for Robust Motion Deblurring", ECCV, Part 1, LNCS 6311, (2010), 157-170.

\* cited by examiner

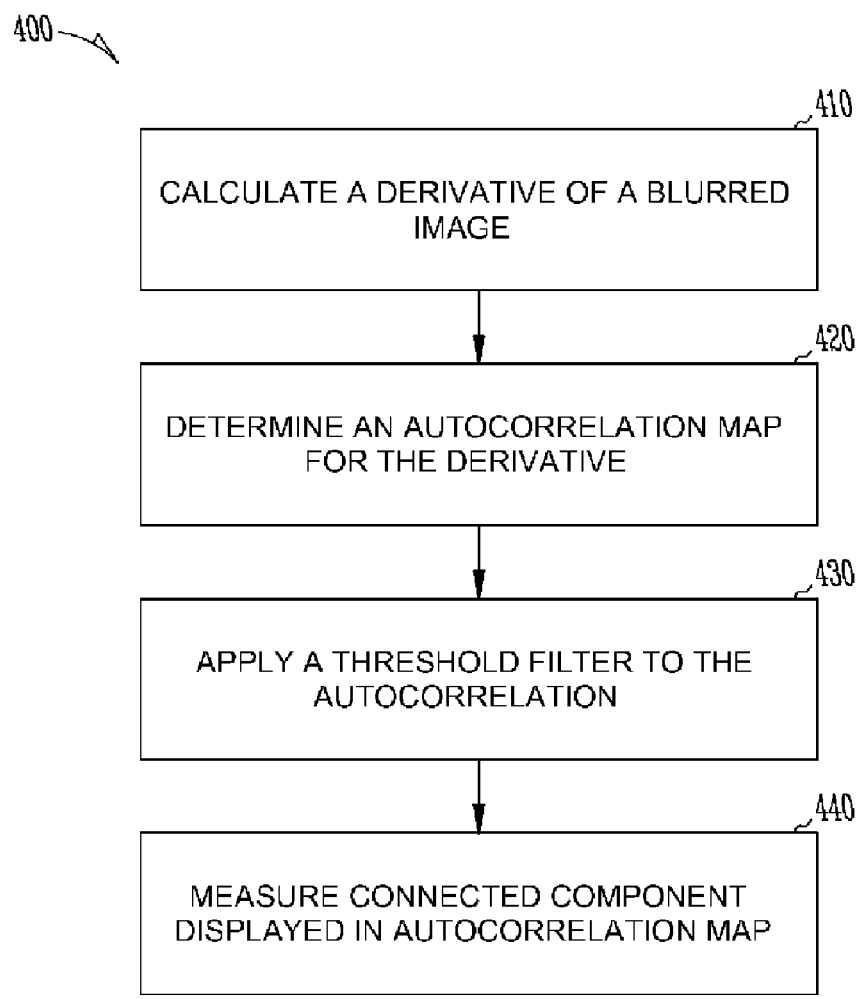

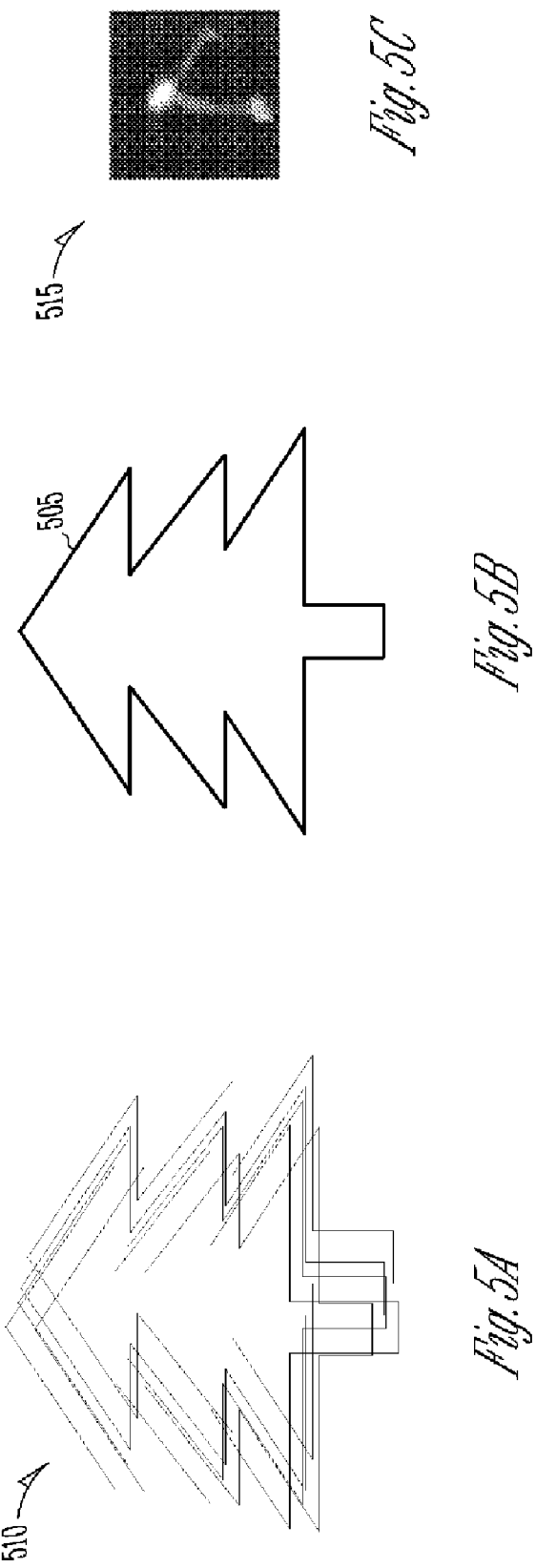

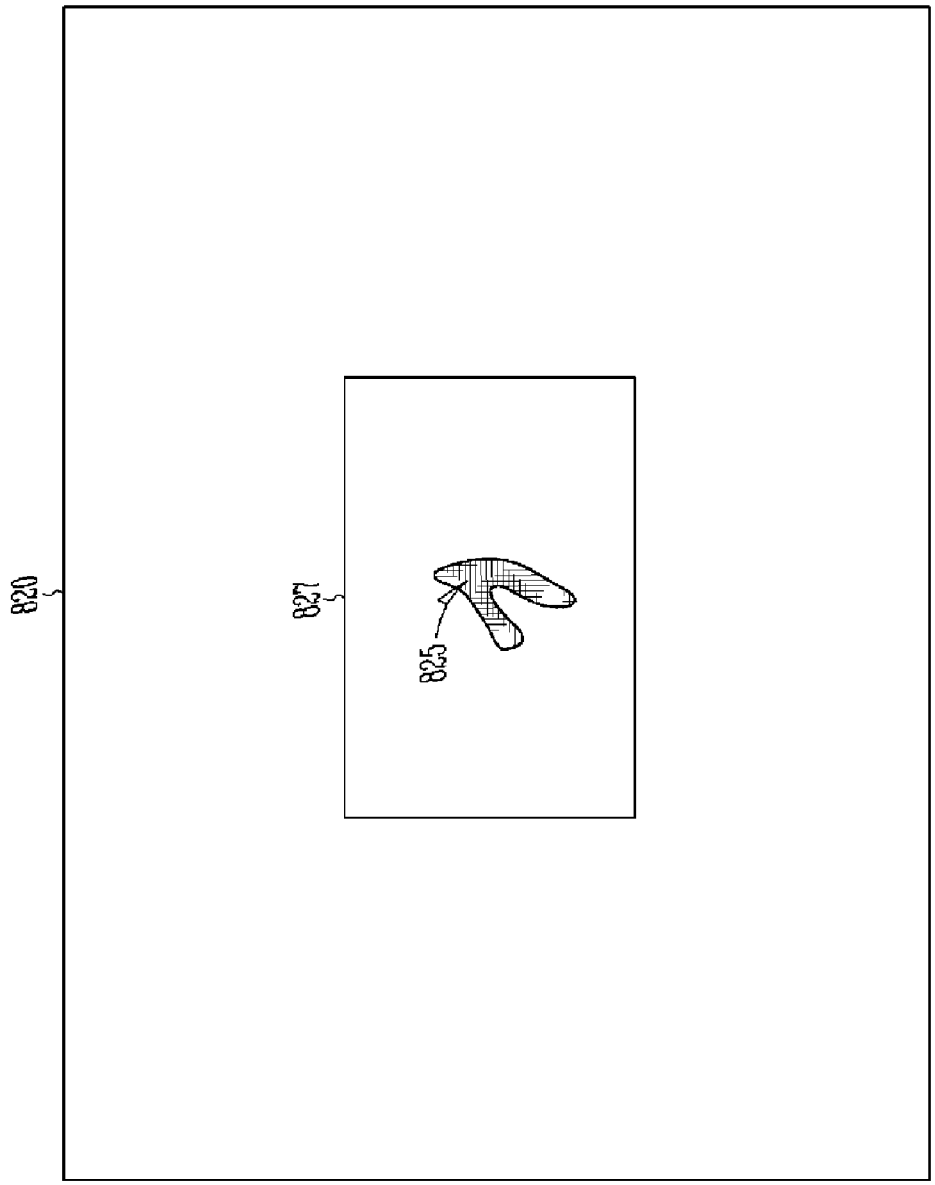

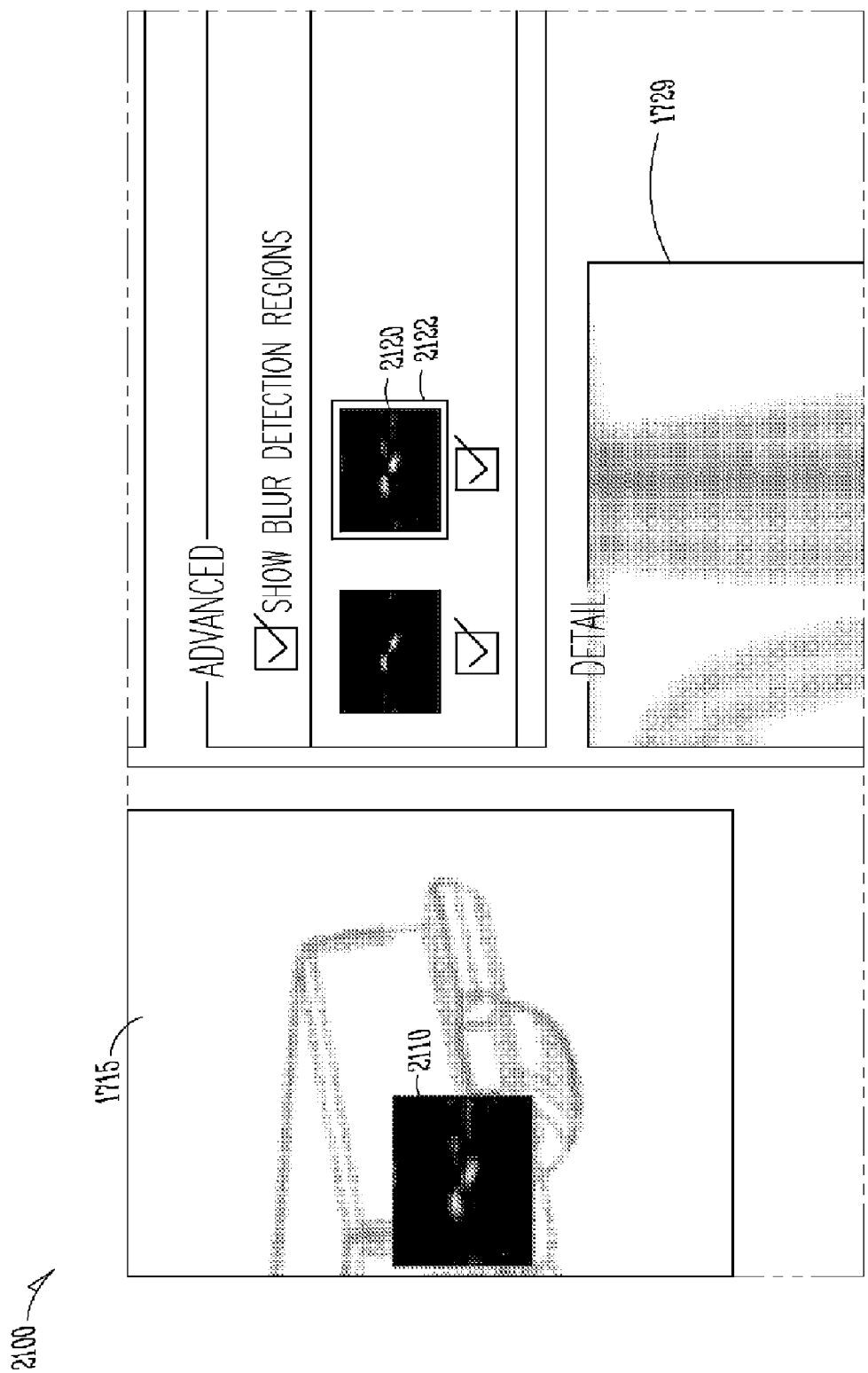

DEBLURRING IMAGES HAVING SPATIALLY VARYING BLUR

CROSS-REFERENCE TO RELATED APPLICATIONS

This application is a continuation of and claims priority from U.S. application Ser. No. 14/061,068, filed Oct. 23, 2013, entitled "Deblurring Images Having Spatially Varying Blur," which is assigned or under obligation of assignment to the same entity as this application, the entire contents of the application being herein incorporated by reference.

TECHNICAL FIELD

The subject matter disclosed herein generally relates to image processing and editing, and, more specifically, to deblurring images having spatially varying blur.

BACKGROUND OF THE INVENTION

Taking handheld photos in low-light conditions is challenging. Since less light is available, longer exposure times are needed to obtain an adequately exposed image. A consequence of longer exposure times is that the quality of the photo is more susceptible to camera movement which, in turn, results in a blurred image. In order to avoid camera movement, photographers frequently use a tripod to support a camera. However, use of a tripod to remove movement is not always practical. This is particularly relevant with the proliferation of mobile phones with built-in cameras. Consequently, in many, if not almost all circumstances, camera shake is likely to be an issue resulting in blurry pictures.

Blur may be removed, with varying degrees of success, from a blurred image in an attempt to recover a latent sharp image. Known techniques utilize a single blur kernel to deblur an entire image using deconvolution. These known techniques are not effective when blur is present in only a portion of the image. Accordingly, an enhanced technique to deblur images where blur is not present in the entire image would be very beneficial.

BRIEF DESCRIPTION OF THE DRAWINGS

The present technology is illustrated by way of example, and not by way of limitation, in the figures of the accompanying drawings.

FIG. 4 is a flow diagram of a method, in accordance with an example embodiment, for estimating a size of a blur kernel for a blurred region in an image using an autocorrelation map.

FIG. 5A shows an example blurred image.

FIG. 5B shows an example latent sharp image for the blurred image of FIG. 5A.

FIG. 5C shows an example blur kernel for the blurred image of FIG. 5A.

FIG. 8B depicts the measurement of connected components within the blur kernel estimation of FIG. 8A.

FIG. 21 is a GUI, in accordance with an example embodiment, illustrating an overlay of a blur kernel on an associated image.

DETAILED DESCRIPTION OF THE INVENTION

In the following description, for purposes of explanation, numerous specific details are set forth to provide a thorough understanding of example embodiments. It will be evident to one skilled in the art, however, that the present subject matter may be practiced without these specific details.

Overview

Example methods and systems to reduce (ideally remove) spatially varying blur from images are described. In order to more adequately remove spatially varying blur, multiple blur kernels may be used to deblur different blurred regions in a single image. For example, a photo editing application (e.g., Adobe® Photoshop®, LightRoom® or the like) may access an image having a first blurred region and a second blurred region. A first blur kernel is generated for the first blurred region, and a second blur kernel is generated for the second blurred region. It will be appreciated that, depending on the amount of blur and location of the blur within the image, several other blur kernels may be generated.

Continuing with the example above, once the first and second blur kernels are generated, the first blur kernel is positioned with respect to the first blurred region, and the second blur kernel is positioned with respect to the second blurred region based on the position of the first blur kernel. The image is then deblurred by deconvolving the first blurred region with the first blur kernel and deconvolving the second blurred region with the second blur kernel. In certain circumstances, the position of the second blur kernel is also based on non-zero values of the first blur kernel or a correlation between the first and second blur kernels. The first blur kernel may be located proximate to a center of the image or located at a location closest to a focal point of the image.

In certain circumstances, the difference in blur kernels for adjacent areas in the blurred image may be relatively minor. Accordingly, the image may be divided into multiple regions or non-overlapping tiles, each tile comprising a plurality of pixels. All pixels in each tile may then be uniformly deconvolved with a blur kernel. After each local region has been deblurred, the deblurred regions may be combined to provide a final deblurred image. In an example embodiment, blending regions between tiles may be defined.

Example Computing Environment

As described herein, in some example embodiments, systems and methods are described that are configured to deblur images via an image or photo editing application, such as the Adobe® Photoshop® family of applications. The technology may be implemented by one or more applications resident on a computing device (e.g., mobile computing device) and/or in a networked environment (e.g., a cloud-based network environment) where processing may, or may not, be distributed.

Figure 1A:
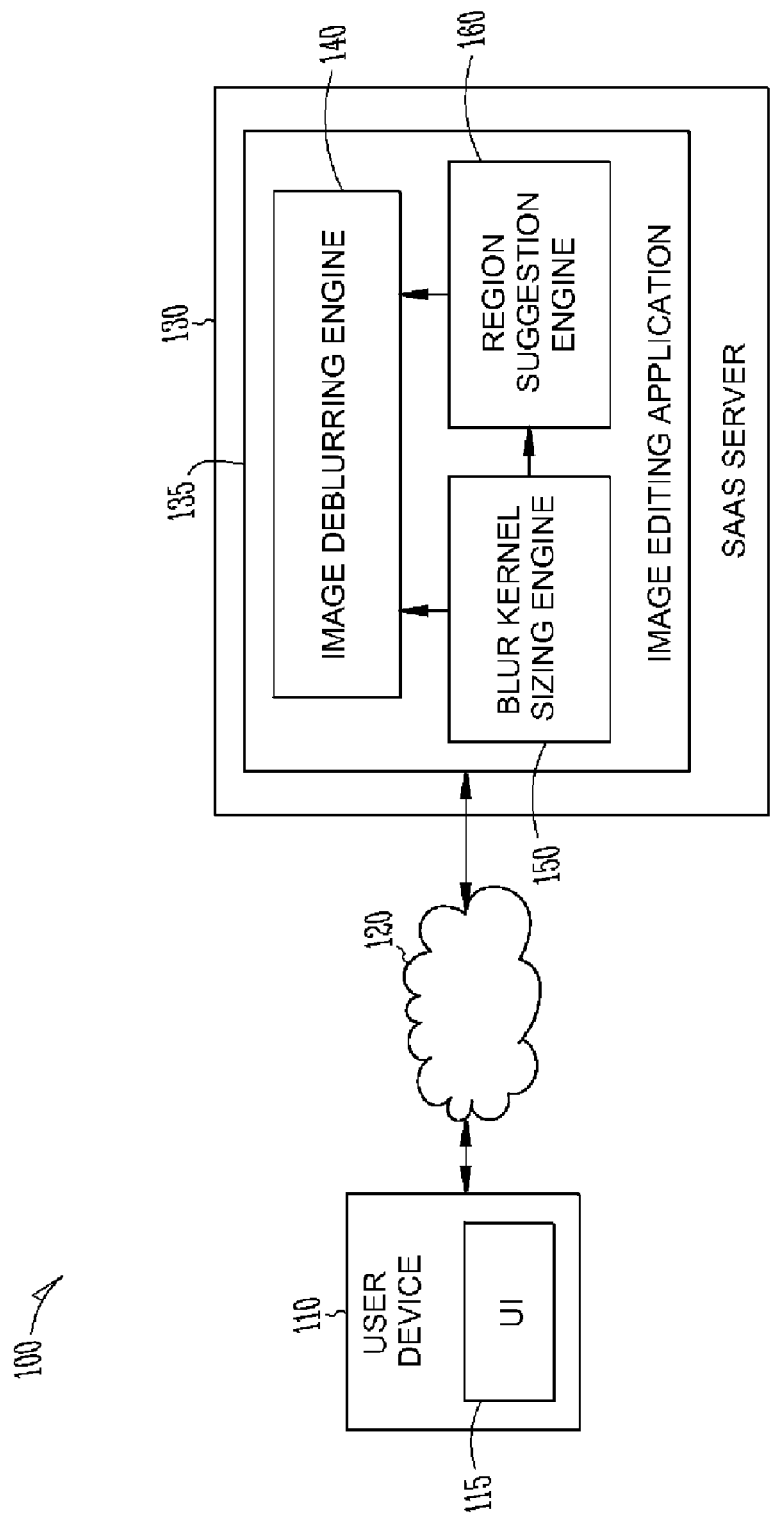
FIG. 1A is a diagram of a network environment, in accordance with an example embodiment, in which applications for editing images may be deployed.

FIG. 1A is a diagram of a network environment 100, in accordance with an example embodiment, for editing images or otherwise processing images (e.g., digital photographs). The network environment 100 is shown to include a user device 110 that supports a user interface 115 configured to receive input from an associated user, and configured to present information to the user to allow deblurring of images. The user device 110 may include a web browser application, an application (e.g., "app"), or other programs configured to display images and/or allow the user to input or identify images for editing. For example, the user interface 115 may facilitate the access of one or more photographic images stored on the user device 110 (e.g., in a photo library), and import images from remote devices and/or applications and so on. The user interface 115 may form part of a photo editing application (e.g., Adobe® Photoshop®, LightRoom® or the like).

The user device 110 is shown to communicate over a network 120 with a server 130 (e.g., a Software as a Service (SAAS) server), which provides a cloud-based and/or network-based image editing application 135. The image editing application 135 may communicate with the user device 110 and its user interface 115 to facilitate the editing of images by the user via the user device 110.

The network 120 may be any network that enables communication among machines, databases, and devices (mobile or otherwise). Accordingly, the network 120 may be a wired network, a wireless network (e.g., a mobile or cellular network), a storage area network (SAN), or any suitable combination thereof. In an example embodiment, the network 120 includes one or more portions of a private network, a public network (e.g., the Internet), or combination thereof. The user device 110 may be any suitable computing device, such as a desktop computer, a laptop computer, a smart phone, a tablet, a gaming device, or any other computing device configured to facilitate interactions between a user and the image editing application 135.

It should be noted that the image editing application 135 may include various components, modules, and/or engines configured to facilitate the deblurring, sharpening, and/or other modifications of images. For example, the images may have a single blurred region, a plurality of blurred regions, and/or other artifacts that degrade the quality of the images and hence removal thereof is desired.

In an example embodiment, the deblurring of an image (or portions of an image) includes techniques that attempt to estimate a latent sharp image for a blurred image (image including blurred regions) by convolving an estimated latent sharp image with a blur kernel. The blur kernel may be represented by a convolution matrix. In an example embodiment, deblurring may utilize the following equation:

$$b = l * k + n$$

where b is the blurred image, l is the latent sharp image, k is a blur kernel, n is image noise, and * is a convolution operator (as discussed in more detail below with reference to FIGS. 5A-C). Deconvolution of the blurred image b, which is a reverse operation of the convolution operation, leads to the latent sharp image l. Deconvolution, therefore, is an operation that may reverse, change and/or modify blur, distortions, or other imperfections in an image. Thus, solving for l by deconvolving the blurred image b with the blur kernel k may lead to an enhanced or sharper image where blurring is at least reduced in blurred regions of the image.

The image editing application 135, therefore, may comprise various components to deblur images including, but not limited to, an image deblurring engine 140, a blur kernel sizing engine 150, and a region suggestion engine 160. The image deblurring engine 140 may be configured to deblur images having multiple blurred regions (e.g., spatially varying blur), the blur kernel sizing engine 150 may be configured to automatically (e.g., without human intervention) determine a size of one or more blur kernels utilized in deblurring images, and the region suggestion engine 160 may be configured to automatically identify and/or suggest regions within a blurred image at which to apply and/or generate blur kernels.

Figure 1B:
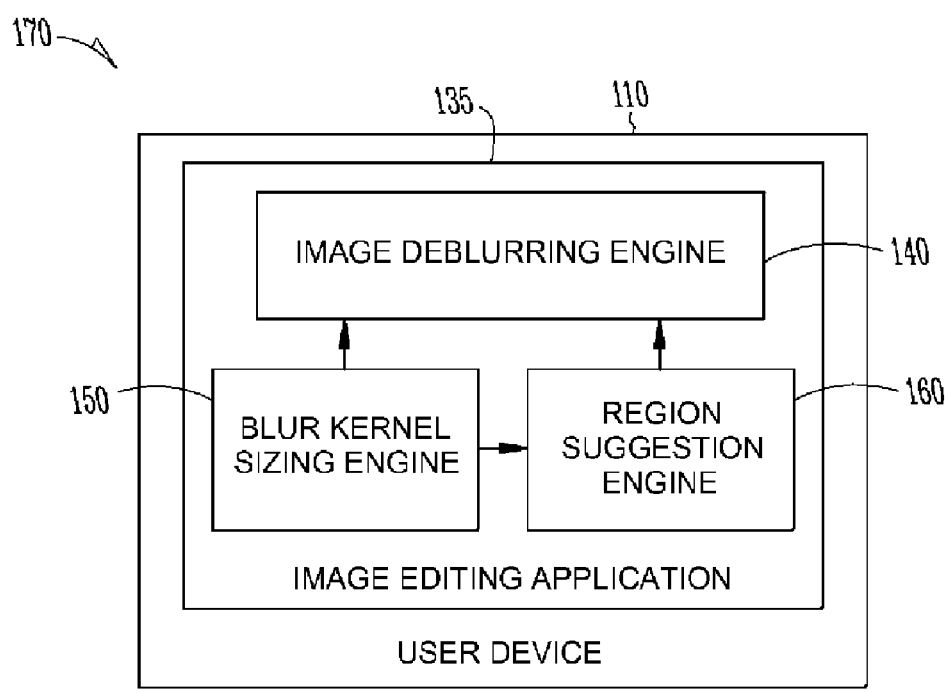
FIG. 1B is a block diagram of a user device, in accordance with an example embodiment, configured to edit images.

Although the example image editing application 135 is shown as being part of a network environment 100, it may be deployed wholly, or in part, on any of the machines, databases, or devices shown in FIG. 1A. For example, FIG. 1B is a block diagram of a user device 170, in accordance with an example embodiment, configured to edit images. The user device 170 may be the same or similar to the user device 110 and may be configured to support the image editing application 135 (as a standalone or networked device). For example, the user device 170 may store and execute software/instructions to facilitate interactions between a user and the image editing application 135 via the user interface 115 of the user device 110.

In some example embodiments, the image editing application 135 may perform, or cause to be performed, various image editing tasks at different networked locations. For example, the image editing application 135 may remotely estimate blur kernels at the server 130, while locally deblurring images at the device 110, or vice versa. The use of different resources may be user-selectable, such that a user may configure the image editing application 135 to perform certain tasks remotely, or in the cloud, and other tasks locally.

Examples of Automatically Determining the Size of a Blur Kernel

As described herein, deblurring an image involves deconvolving one or more blurred regions using at least one blur kernel. At times, users attempting to deblur an image having blurred regions may be unable (or of insufficient skill) to define an appropriate size of the blur kernel used to deblur the image. For example, when a selected size of the blur kernel is too small, the selected blur kernel may be considered an unsuitable kernel, which may not properly or sufficiently deblur the image. Also, when a selected size of the blur kernel is too large, the selected blur kernel may not properly or sufficiently deblur the image. Therefore, automatically estimating and/or determining the size of blur kernels may provide users with suitable blur kernels of appropriate size to adequately deblur images (e.g., via existing deblurring algorithms and/or the algorithms described herein). In an example embodiment, the automated estimation of the size of the blur kernel is calculated electronically without human input influencing the size of the blur kernel. In another example embodiment, the size of the blur kernel may at least partially be determined based on algorithms that do not depend on user input.

Figure 2:
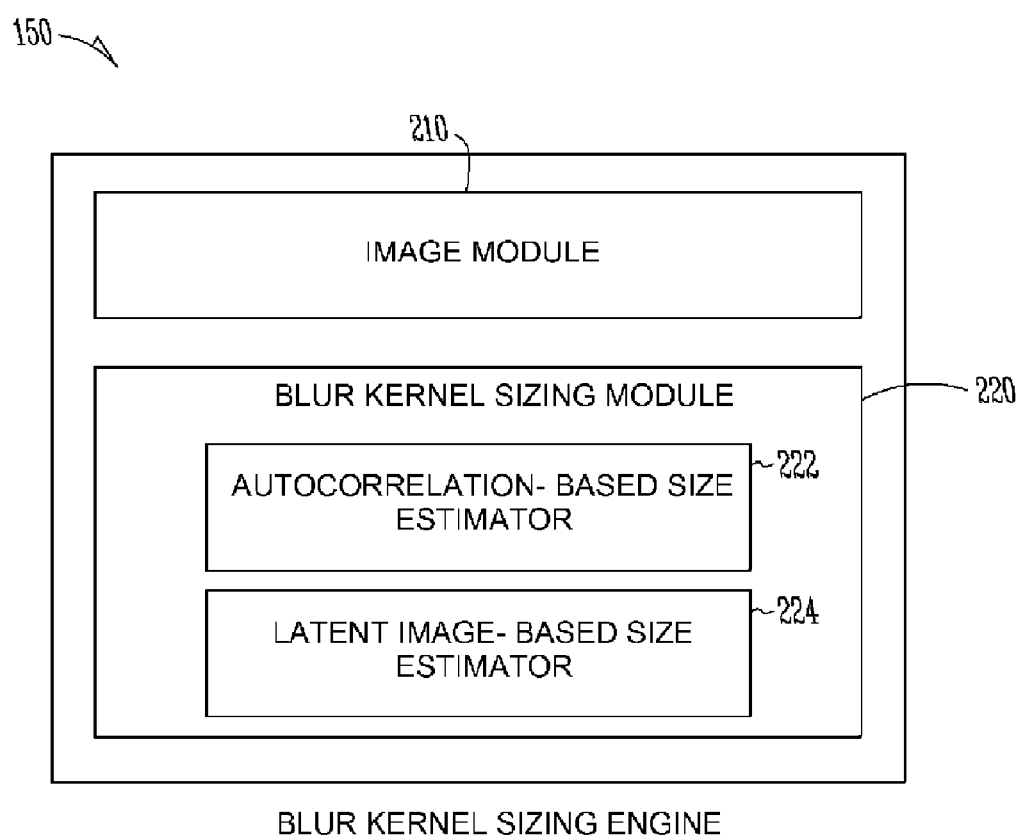
FIG. 2 is a block diagram of example components of a blur kernel sizing engine, in accordance with an example embodiment.

As described herein, example systems and methods are described that may automatically estimate or otherwise determine the size of a blur kernel used to deblur at least one region of a blurred image. FIG. 2 is a block diagram of example components (or modules) of a blur kernel sizing engine 150, in accordance with an example embodiment. The example components may be hardware, software, or a combination of hardware and software, and may be executed by one or more processors. In the example embodiment, the blur kernel sizing engine 150 is shown to include an image module 210 and a blur kernel sizing module 220. The blur kernel sizing module 220 may include an autocorrelation-based size estimator 222 to estimate a first size of the blur kernel, a latent image-based size estimator 224 to estimate a second size of the blur kernel, and process the results to suggest or recommend a size of the blur kernel to be used to deblur the image. It is however to be noted that the autocorrelation-based size estimator 222 and the latent image-based size estimator 224 are merely examples of estimators, and that other mathematical techniques may be used in other embodiments.

The image module 210 may be configured (e.g., a programmed processor) to access an image (e.g., an image stored in a photo library on a device) having at least one blurred region. In an example embodiment, a user selects or identifies an image including a region to be deblurred using a graphical user interface, and the image module 210 then accesses the image (e.g., accesses data defining the image) for processing.

In some example embodiments, the blur kernel sizing module 220 is configured to estimate a size of a blur kernel for the accessed image using two different sizing estimators.

Figure 3:
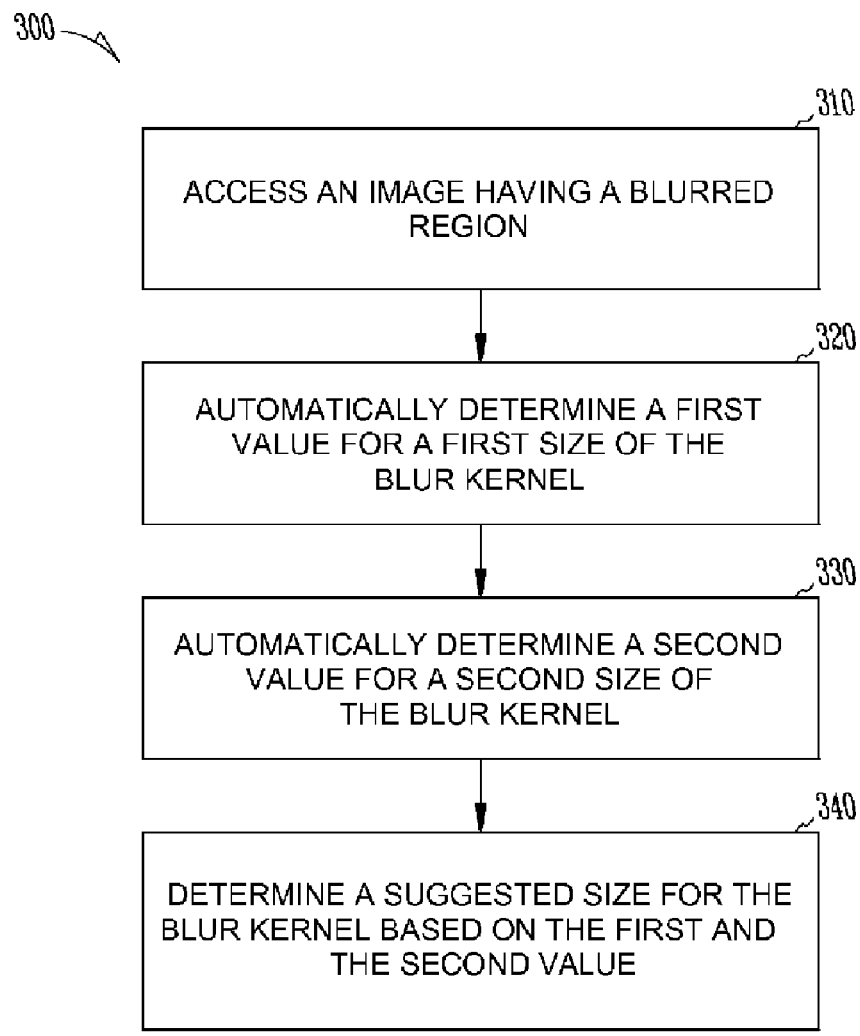
FIG. 3 is a flow diagram of a method, in accordance with an example embodiment, for determining a suggested size of a blur kernel for a blurred region in an image.

For example, the blur kernel sizing module 220 may automatically determine a first value for a first size of a blur kernel for a blurred region using a first sizing estimator (e.g., the autocorrelation-based size estimator 222), automatically determine a second value for a second size of the blur kernel using a second, different, size estimator, and select a suggested size for the blur kernel that is based on the first value and the second value, as described in more detail with reference to FIG. 3. It should be appreciated that the estimated values for the sizes of the blur kernel may however be computed by the same estimator or any one or more estimators.

FIG. 3 is a flow diagram of a method 300, in accordance with an example embodiment, for determining a suggested size of a blur kernel for deblurring a blurred region in an image. The method 300 may be performed by the blur kernel sizing engine 150 and, accordingly, is described herein merely by way of example with reference thereto. It will be appreciated that the method 300 may be performed on any suitable hardware.

In the method 300, the blur kernel sizing engine 150 may access data representing an image (herein also referred to as accessing the image) having at least one blurred region (see operation 310). For example, the image module 210 may access a blurred image including one or more blurred regions. In some example embodiments, the image module 210 may downsample the accessed image in order to reduce noise and/or reduce the size of the blurred regions that are used to estimate the size of a blur kernel.

Thereafter, as shown in operations 320 and 330, the blur kernel sizing engine 150 automatically, without user input, determines a first value for a first size of a blur kernel, and automatically, without user input, determines a second value for the size of the blur kernel to be used in deblurring a region of the image. In an example embodiment, two different sizing techniques may be used to determine the first and second values. As mentioned above, the first size estimator may be an autocorrelation-based size estimator (e.g., the autocorrelation-based size estimator 222), which determines an estimated size of the blur kernel based on autocorrelating the accessed image with a derivative of the accessed image, as discussed by way of example below with reference to FIG. 4.

As shown in operation 340, the method 300 may then automatically determine a suggested size for the blur kernel based on the first and second values.

FIG. 4 is a flow diagram of a method 400, in accordance with an example embodiment, for estimating a size of a blur kernel for a blurred region in an image using an autocorrelation process. The method 400 may be performed by the autocorrelation-based size estimator 222 and, accordingly, is described herein merely by way of example with reference thereto. It will be appreciated that the method 400 may be performed on any suitable hardware.

A correlation operation f∘g between two images f and g may be defined as:

$$f \circ g = f^* * g$$

where ∘ is a correlation operator, and f* is a flipped version of f, which may be flipped both horizontally and vertically (e.g., f(x,y)=f(−x,−y) where x and y are pixel coordinates). Autocorrelation occurs when f and g are identical. In some cases, derivatives of natural images are usually weakly correlated to one another, and autocorrelation results of image derivatives may be approximated by a delta function, which has a single nonzero peak, while other values are zero. However, when an image is blurred and includes blurred regions, derivatives of the image become more correlated to the image and/or to one another, and the autocorrelation becomes less similar to a delta function. Accordingly, in an example embodiment, a corresponding blur kernel may be based the deviation of the autocorrelation (e.g., delta function).

Mathematically, the autocorrelation of a derivative of a latent sharp image 1 should be close to a delta function, such as:

$$(d*l) \circ (d*l) = ((d*l)**(d*l)) \approx \delta$$

where d is a discrete differential operator, and $\delta$ is a delta function. However, the autocorrelation of a derivative of a blurred image b is:

$$(d*b) \circ (d*b) = (d*k*l)**(d*k*l) = (k**k)*$$
$$((d*l)**(d*l)) \approx (k**k)*\delta$$

The autocorrelation of (d*b) is related to the blur kernel k. Therefore, the actual blur size may be related to the nonzero elements in the autocorrelation result. For example, assuming a blur kernel size is generalized as $W_k \times H_k$, the size of k**k is $(2W_k) \times (2H_k-1)$.

Accordingly, in an example embodiment, in operation 410 the autocorrelation-based size estimator 222 calculates a derivative for the blurred regions of the accessed image. The autocorrelation-based size estimator 222 may apply a differential operator to data representing the accessed image, such as a discrete differential operator d, defined as:

$$d = \begin{bmatrix} 0 & -1 & 1 \\ 0 & 1 & -1 \\ 0 & 0 & 0 \end{bmatrix}$$

FIG. 5A shows an example of a blurred image 510, FIG. 5B shows a latent sharp image 505 corresponding to the blurred image 510, and a corresponding blur kernel 515 is shown in FIG. 5C. The autocorrelation-based size estimator 222 may calculate various derivatives of the blurred image 510, such as first order derivative, a second order derivative, and so on. By computing derivatives, in an example embodiment, pixels in flat regions can be removed from being considered in the autocorrelation map. Other derivative filters may provide similar effects, and they may be used instead.

Referring back to FIG. 4, in operation 420, the autocorrelation-based size estimator 222 may determine an autocorrelation map for the derivative. The autocorrelation map may reflect the autocorrelation between the blurred image 510 and the derivative of the blurred image 510. In an example embodiment, the autocorrelation-based size estimator 222 may compute the autocorrelation using a Fourier transform, or other similar technique.

Thereafter the method 400, as shown in operation 430, applies a threshold filter to the autocorrelation of the blurred image and the derivative thereof. For example, in order to determine the size of the blur kernel from the autocorrelation map, the autocorrelation-based size estimator 222 may identify the extent of nonzero elements within the autocorrelation map, and determine the size of the blur kernel based on the nonzero elements (e.g., as described with reference to FIGS. 6A and B below). However, in some cases, noise and/or repetitive patterns, such as textures in the latent image l, may introduce misleading nonzero values, which may cause the autocorrelation result to differ from a delta function. The autocorrelation-based size estimator 222 may, therefore, apply a threshold filter to the autocorrelation result to remove small non-zero components (e.g., less than a threshold value) from the autocorrelation result, in order to correctly and/or robustly estimate the extent of nonzero elements caused by the blur kernel k, among other things.

In operation 440, a connected component in the autocorrelation map may be identified (e.g., using the autocorrelation-based size estimator 222). For example, the autocorrelation-based size estimator 222 may measure a cluster of nonzero elements within the autocorrelation map, which may then define the connected components.

Figure 6A:
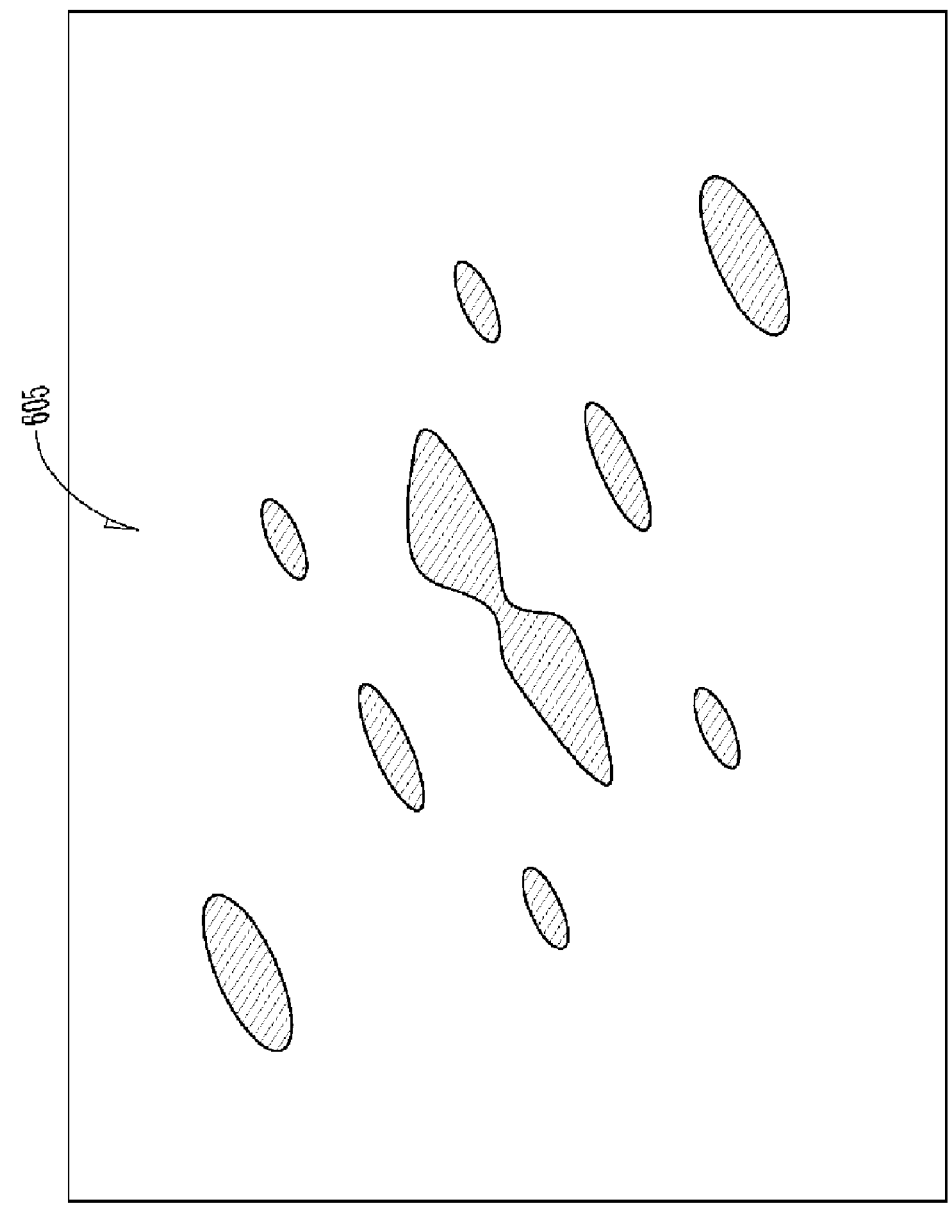
FIG. 6A shows a screen shot illustrating an autocorrelation map, in accordance with an example embodiment.
Figure 6B:
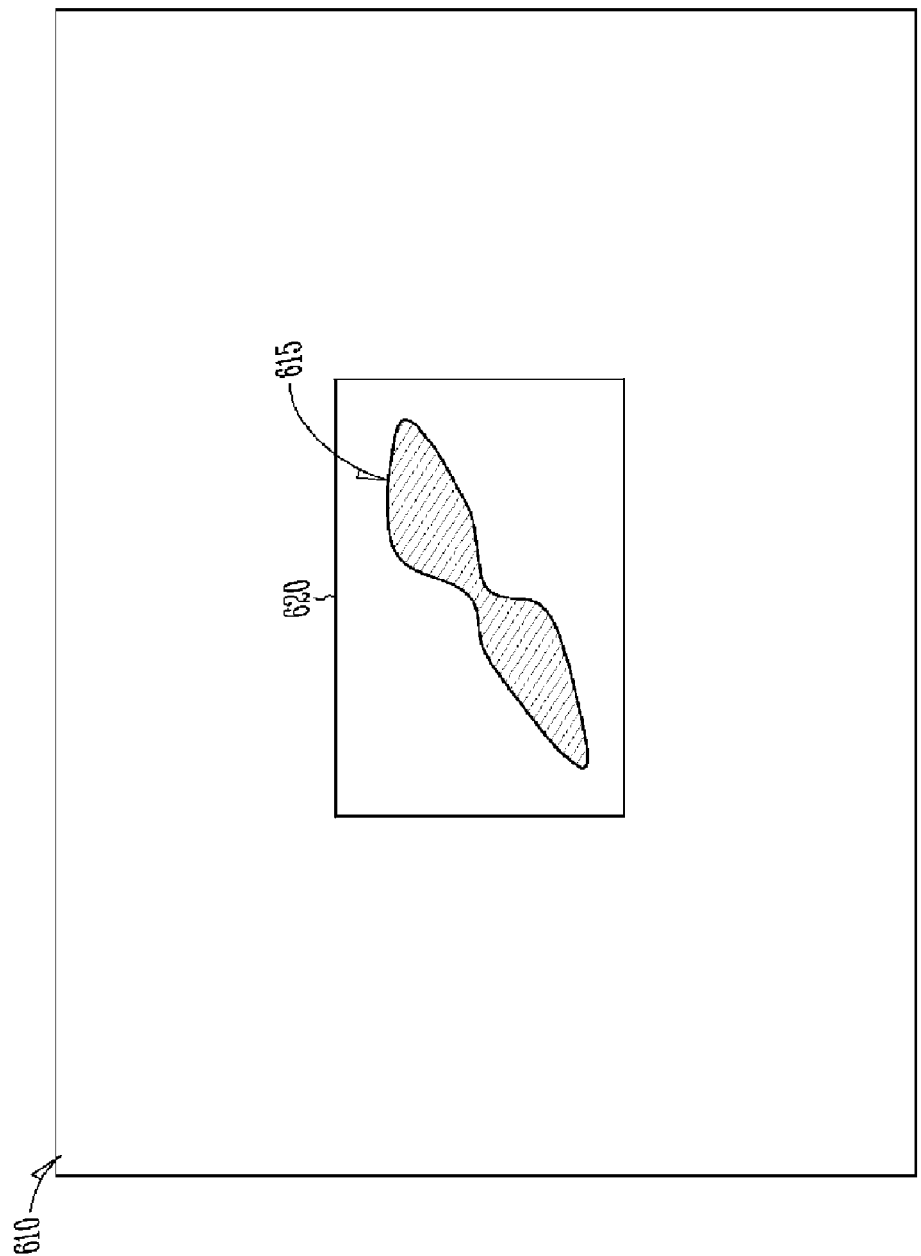
FIG. 6B shows a screen shot illustrating selected connected components within the example autocorrelation map of FIG. 6A.

FIG. 6A shows a screen shot 600 illustrating an example autocorrelation map 605 determined using the method 400. As shown in FIG. 6A, the components are symmetrical. FIG. 6B shows a screen shot 610 illustrating selected connected components 615 within the example autocorrelation map 605. For example, the autocorrelation-based size estimator 222 may identify the connected component 615 of nonzero elements centered within an autocorrelation map 605, and measure the dimensions (e.g., a maximum width and height) of the connected component 615 in a connected component zone, shown as box 620. The autocorrelation-based size estimator 222 may then determine and/or estimate the size of the blur kernel based on the measured width and height of the connected component 615. For example, the autocorrelation-based size estimator 222 may determine the box 620 is 21 by 21 pixels, and automatically estimate the size (e.g., determine a lower and/or higher value) of the blur kernel to be 21 by 21 pixels, or within a range of sizes that includes the determined size of the box 620. It should be noted that the area or zone of connected components may, in other embodiments, be of different shapes and that a box is merely an example of such a shape.

In some example embodiments, the second size estimator (e.g., the latent image-based size estimator 224) estimates a size based on an estimated latent image. For example, the latent image-based size estimator 224 may automatically generate and/or determine a rough guess or estimate of a latent image l for the blurred image, and use the estimated latent image to automatically determine the size of the blur kernel.

Figure 7:
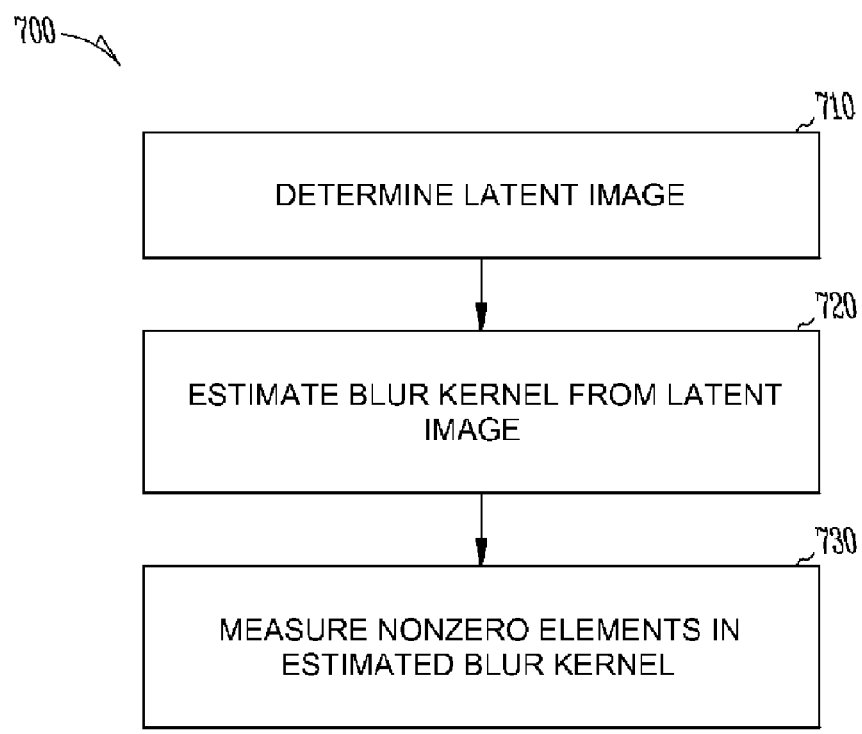
FIG. 7 is a flow diagram of a method, in accordance with an example embodiment, for estimating a size of a blur kernel for a blurred image using a latent image process.

FIG. 7 is a flow diagram of a method 700, in accordance with an example embodiment, for estimating a size of a blur kernel for an image using a latent image process. The method 700 may be performed by the latent image-based size estimator 224 and, accordingly, is described herein merely by way of example with reference thereto. It will be appreciated that the method 700 may be performed on any suitable hardware.

In operation 710, the latent image-based size estimator 224 determines an estimated latent image for the accessed image. The latent image-based size estimator 224 may apply a shock filter to a blurred image b to restore sharp edges within the image. The latent image-based size estimator 224 may then compute one or more gradient maps from the shock filtered result. Optionally, gradient values of small magnitudes (e.g., below or equal to a gradient threshold) may be removed to remove noise and determine a gradient map $p_x$ and $p_y$, which represents the estimated latent image.

Thereafter, as shown in operation 720, a blur kernel may be estimated from the latent image, for example, using the latent image-based size estimator 224. Given $p_x$ and $p_y$ are suitable for an estimated latent image, the method 700 may estimate (e.g., using the latent image-based size estimator 224) a blur kernel k by solving the following example optimization equation:

$$k = \arg\min_{k} (\|p_x * k - d_x * b\|^2 +$$

$$\|p_y * k - d_y * b\|^2 + \alpha\|d_x * k\|^2 + \|d_y * k\|^2 + \beta\|k\|^2)$$

where $d_x$ and $d_y$ are the first order discrete differential operators along the x and y axes, the first two terms are data fidelity terms based on image gradients, the third and fourth terms are regularization terms to cause a blur kernel k to be smooth and continuous, the fifth term is a Tikhonov regularization term to further stabilize the optimization problem, and $\alpha$ and $\beta$ are regularization strength for each regularization term.

Figure 8A:
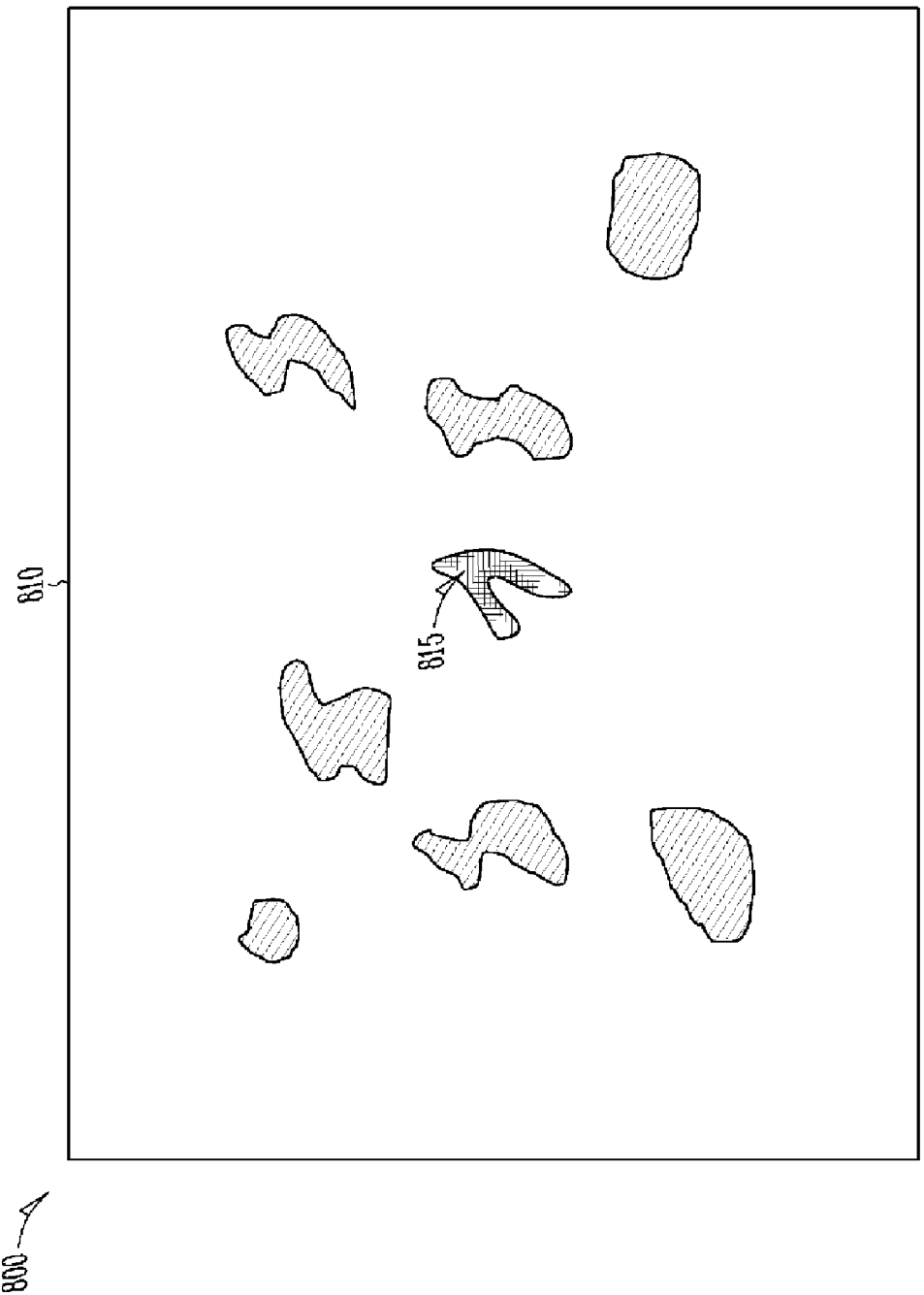
FIG. 8A depicts an example image of blur kernel estimation from a latent image.

In an example embodiment, the latent image-based size estimator 224 solves the above equation using Fourier transforms, as follows:

$$K(u, v) = \frac{\overline{P_x(u, v)}D_x(u, v)B(u, v) + \overline{P_y(u, v)}D_y(u, v)B(u, v)}{|P_x(u, v)|^2 + |P_y(u, v)|^2 + \alpha(|D_x(u, v)|^2 + |D_y(u, v)|^2) + \beta}$$

where K, $P_x$, $P_y$, $D_x$, $D_y$ and B are Fourier transforms of k, $p_x$, $p_y$, $d_x$, $d_y$ and b, respectively, and $\overline{P_x(u,v)}$ is the complex conjugate of $P_x(u, v)$. By applying an inverse Fourier transform to K, an estimate of the blur kernel k may be generated (e.g., by the latent image-based size estimator 224). FIG. 8A depicts an example image 800 of a blur kernel 810 estimated from the estimated latent image, including nonzero elements 815 (see operation 710 in FIG. 7.).

Returning to the method 700, in operation 730, nonzero elements of the estimated blur kernel may be measured. For example, the latent image-based size estimator 224 may measure the nonzero elements 815 depicted in the blur kernel 810 by using various techniques described herein, such as the techniques described with respect to FIG. 4. As mentioned above, the size of the blur kernel may be determined from the nonzero elements 815.

For example, FIG. 8B depicts the measurement of connected components 825 within an estimated blur kernel 820. A measured zone (connected component region) illustrated by a box 827 reflects measurement of the connected components 825. For example, the box 827 may have a width of 35 pixels and a height of 31 pixels, and the latent image-based size estimator 224 may automatically estimate the size (e.g., determine a lower and/or higher value) of the blur kernel to be 35 by 31 pixels, or within a range of sizes that includes the determined size of the box 827.

In some example embodiments, the blur kernel sizing engine 150 may receive input from a user which identifies an additional estimated size for the blur kernel. Thus, in an example embodiment, estimation of the size of a blur kernel may be based on one or more automated estimations and a user-defined estimation. These estimations may then, for example, be weighted and used to determine the blur kernel size that will be used to deblur the image selected by the user for processing.

Accordingly, in some example embodiments, the blur kernel sizing engine 150 may utilize the autocorrelation-based size estimator 222 to estimate a lower or smaller value of the size of the blur kernel (operation 320), and may utilize the latent image-based size estimator 224 to estimate a higher or upper value of the size of the blur kernel (operation 330). In some alternate embodiments, the blur kernel sizing engine 150 may utilize the latent image-based size estimator 224 to estimate the lower or smaller value of the size of the blur kernel (operation 320), and may utilize the autocorrelation-based size estimator 222 to estimate the higher or upper value of the size of the blur kernel (operation 330).

Returning to operation 340 in FIG. 3, the blur kernel sizing engine 150 may determine the suggested size for the blur kernel based on the first value and the second value. For example, the blur kernel sizing engine 150 may perform a variety of different determinations or follow various selection criteria or rules when determining the suggested, or actual, size for the blur kernel. Example selection criteria or rules may include:

Select the first value as the suggested size for the blur kernel when the value determined by the autocorrelation-based size estimator 222 is lower than the value determined by the latent image-based size estimator 224;

Select the first value as the suggested size for the blur kernel when the value determined by the autocorrelation-based size estimator 222 is higher than the value determined by the latent image-based size estimator 224;

Select the second value as the suggested size for the blur kernel when the value determined by the autocorrelation-based size estimator 222 is lower than the value determined by the latent image-based size estimator 224;

Calculate the average of the first value and the second value as the suggested size for the blur kernel;

Calculate the average of the first value, the second value, and a user defined size as the suggested size for the blur kernel;

Calculate the median of the first value, the second value, and a user defined size (and/or other estimated values) as the suggested size for the blur kernel; Or Select the value estimated by the autocorrelation-based size estimator 222 when the value is lower than the value estimated by the latent image-based size estimator 224; and so on.

Thus, in some example embodiments, the blur kernel sizing engine 150 and the methods 300 and 700 utilize one or more size estimation techniques to automatically, with or without user input, determine the size of a blur kernel for an input blurred image.

Examples of Automatically Suggesting Regions for Blur Kernel Estimation

As described herein, deblurring an image may involve applying a blur kernel to a blurred region of an image. In some example embodiments, the systems and methods described herein may automatically select a certain region or part of the image at which to estimate a blur kernel. Such as a region may be selected because the characteristics it may have could facilitate accurately and/or effectively deblurring the entire image. The associated blur kernel may then be estimated for the selected region.

The systems and methods, in accordance with example embodiments, may access input or reference parameters, such a blur kernel size (e.g., a size automatically determined by the blur kernel sizing engine 150), and identify a best or suitable region of the image at which to estimate and/or apply the blur kernel. A selected or suitable region may be a region that includes edges of objects in the image (e.g., an outline of a person, a tree, etc.), over-exposed pixels within the image, under-exposed pixels within the image, and/or any features within the image that may break the linearity of motion causing blurring of the image (e.g., blurring due to camera movement).

An additional input parameter may be associated with a user-identified region within the blurred image, and a best or suitable region that is proximate to the user-defined region may be identified. Accordingly, the user may provide an initial reference region (or point in a region), and the user-identified region may be refined or adjusted automatically to enhance deblurring. In some example embodiments, such as when a blurred image includes a spatially varying blur (e.g., two or more distinct blurred regions within the image), the systems and methods may identify multiple suitable regions (ideally best regions) in which to estimate and/or apply an associated blur kernel.

Figure 9:
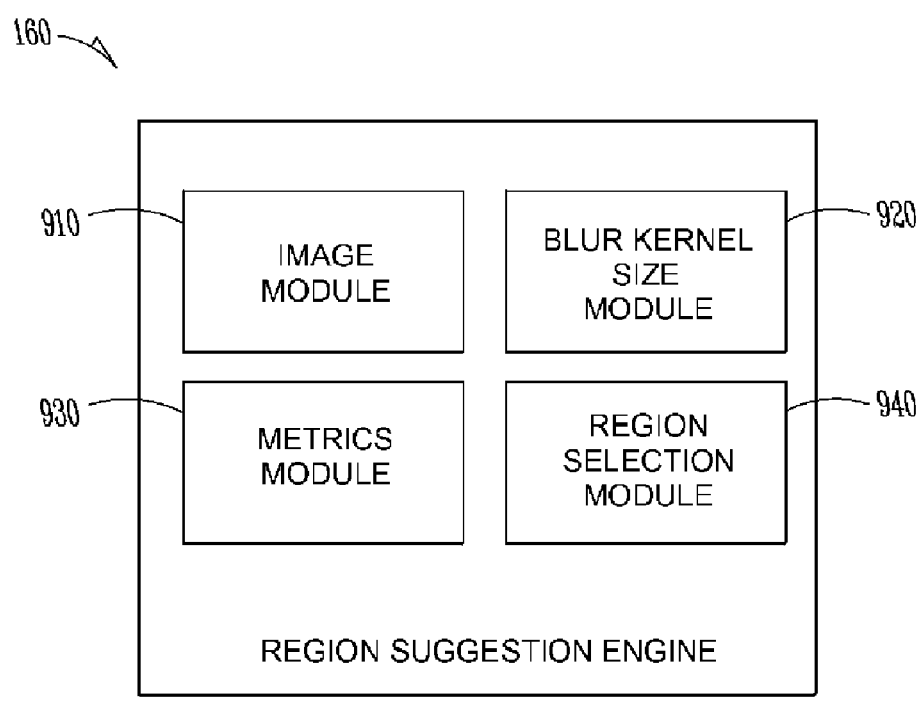
FIG. 9 is a block diagram illustrating example components of a region suggestion engine, in accordance with an example embodiment.

FIG. 9 is a block diagram illustrating example components of a region suggestion engine 160, in accordance with an example embodiment. The region suggestion engine 160 is shown to include a plurality of modules that may be implemented in hardware, software, or a combination of hardware and software, and may be executed by one or more processors. For example, the region suggestion engine 160 may include an image module 910, a blur kernel size module 920, a metrics module 930, and a region selection module 940. The region suggestion engine 160 may utilize representative 2D discrete arrays for a selected blurred image in order to suggest appropriate (ideally best) regions of the images at which to estimate and/or apply blur kernels.

A 2D discrete array may often represent a digital image. For example, given a grayscale image f of size W×H, a representative 2D discrete array may be as follows: $f(x, y) = f_{x,y}$, where $x \in [0, W-1]$ and $y \in [0, H-1]$ are integers for pixel coordinates, and $f_{x,y}$ is the intensity value at the pixel $(x, y)$.

Further, an image gradient $\nabla f(x, y)$ that is the first-order discrete derivative of $f(x, y)$, may be defined as:

$$\nabla f(x, y) = (f_x(x, y), f_y(x, y))^T$$

and a discrete partial derivative $f_x(x, y)$ may be defined as:

$$f_x(x, y) = f(x+1, y) - f(x, y)$$

using the discrete forward difference, and $f_y(x, y)$ may be defined in a similar way. Of course, other definitions for the partial derivatives are also possible.

Additionally, as $\nabla f(x, y)$ is a 2D vector, its magnitude may be defined as:

$$\|\nabla f(x, y)\| = \sqrt{\{f_x(x,y)\}^2 + \{f_y(x,y)\}^2}$$

and its angle may be defined as:

$$\phi(\nabla f(x, y)) = \operatorname{atan}\left(\frac{f_y(x, y)}{f_x(x, y)}\right)$$

The above example 2D discrete array may be utilized to represent a selected blurred image in order to suggest suitable regions of the images at which to estimate and/or apply blur kernels, as described in more detail below.

Returning to the region suggestion engine 160 shown in FIG. 9, in some example embodiments, the image module 910 is configured to access a blurred image represented by a 2D discrete array. For example, the image module 910, which may be similar to the image module 210, may access an image selected by a user of the image editing application 135, via the user interface 115 of the user device 110. It will be appreciated that images may be stored in various different locations (e.g., in a photo library stored on a device or in the cloud) and such access may be directly or via a network (e.g., see FIG. 1).

The blur kernel size module 920 is configured to define a size for a blur kernel associated with the blurred image. In an example embodiment, the blur kernel size module 920 employs similar or the same methodology as described herein with respect to the blur kernel sizing module 220. Accordingly, the blur kernel size module 920 may include one or more blur estimators, such as the autocorrelation-based size estimator 222 and/or the latent image-based size estimator 224. For example, the blur kernel size module 920 (or, the blur kernel sizing module 220), may automatically determine a lower value for a size of a blur kernel for the blurred region using a first size estimator, automatically determine an upper value for the size of the blur kernel using a different second size estimator, and determine a size for the blur kernel that is based on the lower and upper value for the size of the blur kernel.

In some example embodiments, the image module 910 may access a blurred image, such as a blurred image b, and preprocess the blurred image by downsampling the image with respect to the input blur kernel size, such as a size $N_k \times N_k$. The downsampling may reduce the image size (e.g., such that computational time is reduced), may reduce the blur, may reduce noise or artifacts, and so on. The downsampled image $b_{low}$ may have a size $W_{low} \times H_{low}$.

The metrics module 930 may be configured to determine metrics for at least two of the plurality of regions based on a number of edge orientations within a region. The metrics module 930 may perform various algorithmic processes to identify image characteristics and/or features associated with favorable or suitable regions within the selected image. A suitable region may be any region determined to be favorable for deblurring but may not necessarily be the most suitable region within the blurred image. Such a region deemed suitable may be based on analyzing the image to identify contrast edges of many different directions, and/or few or no corrupted pixels (e.g., saturated pixels) within the selected image. For example, the metrics module 930 may identify regions that include objects having edges of different orientations to facilitate estimation by the metrics module 930 of a blur kernel. In an example embodiment, a blur kernel may be selected or defined in a direction orthogonal to an orientation (e.g., edge direction) of a selected edge. For example, to identify a blur kernel of size $N_k \times N_k$, a region may include $N_k$ different edge directions.

The metrics module 930 may define an image region R as a set of pixels in the region, such that:

$$R = \{(x, y) | R_{left} \leq x < R_{right} \wedge R_{top} \leq y < R_{bottom}\}$$

where $R_{left}$ and $R_{right}$ are the leftmost and rightmost x coordinates, and $R_{top}$ and $R_{bottom}$ are the topmost and bottommost y coordinates in the region R. The metrics module 930 may then calculate a metric associated with a usefulness U(r) of a candidate region r, as:

$$U(R) = (\text{NumEdgeOrientations}(R) + \alpha \cdot \text{AvgGradMag}(R)) \cdot \text{ClipWeight}(R)$$

where NumEdgeDirections(R) is the number of available edge orientations, AvgGradMag(R) is the average gradient magnitude, and ClipWeight(R) is a weight for giving penalty to over- or under-exposed pixels in the region R, and $\alpha$ is a weight for controlling the amount of contribution of AvgGradMag(R).

In some example embodiments, the variable NumEdgeDirections(R) is the number of available edge orientations in the selected image. To count the number of orientations, the metrics module 930 may detect edges in the region R, and uniformly discretize angles into M sections with a step angle $\theta$, such that $M \cdot \theta = \pi$, where:

$$M = \max\left(\left\lfloor \frac{N_k}{110} \right\rfloor, 4\right).$$

Each section $S_i$ may be defined as $S_i=[i\theta, (i+1)\theta)$, and the metrics module 930 may count the number of sections that have sufficient (e.g., a reference number) of suitable edge pixels, represented as:

$$NumEdgeOrientations(r) = \sum_{i=0}^{M-1} H[|E_{r,i}| - t_{orient}]$$

where $H[n]$ is the Heaviside step function, defined as $H[n]=1$ if $n \geq 0$, and otherwise $H[n]=0$. $E_{r,i}$ is the set of edge pixels whose angles belong to $S_i$, defined as $E_{r,i} = \{p | p \in R_{edges} \land \phi(p) \in S_i\}$. $|E_{r,i}|$ is the cardinality or the number of elements of the set $E_{r,i}$, $t_{orient}$ is a threshold value for only counting sections having enough edge pixels, $R_{edges}$ is the set of edge pixels in R detected by edge detection, and $\phi(p)$ is the angle of the edge pixel p, where edge pixels are detected using gradient magnitudes (e.g., when the gradient magnitude of a pixel is larger than a certain value, the pixel belongs to an edge).

In some example embodiments, the variable AvgGradMag(R) is the average gradient magnitude value of the pixels in the region r. For example, when an image region r has more edges of large contrast, then AvgGradMag(R) becomes large, and vice versa. AvgGradMag(R) may be defined as:

$$AvgGradMag(R) = \frac{1}{\lceil R \rceil} \sum_{(x,y) \in R} \|\nabla b_{low}(x, y)\|$$

AvgGradMag(R) is usually a very small number compared to NumEdgeOrientations(R), and may be balanced by a constant $\alpha$, such as $\alpha = 10$.

In some example embodiments, the variable ClipWeight(R) is defined as:

$$ClipWeight(R) = \sum_{(x,y) \in R} c(x, y)$$

where $c(x, y)$ is a pixel-wise weight function defined as:

$$c(x, y) = \begin{cases} 1 & \text{if } c_{low} \leq b_{low}(x, y) \leq c_{up} \\ \exp\left(-\frac{|b_{low}(x, y) - c_{up}|^2}{\sigma_c^2}\right) & \text{if } b_{low}(x, y) > c_{up} \\ \exp\left(-\frac{|b_{low}(x, y) - c_{low}|^2}{\sigma_c^2}\right) & \text{if } b_{low}(x, y) < c_{low} \end{cases}$$

where $c_{up}$ and $c_{low}$ are thresholds for detecting over- and under-exposed pixels, respectively, and $\sigma_c$ is a parameter for controlling the shape of the function $c(x, y)$. For example, $$c_{up} = \frac{220}{225}, c_{low} = \frac{10}{255}, \text{ and } \sigma_c = \frac{40}{255}.$$

In some example embodiments, when an image includes spatially varying blur, blur kernels may be estimated from regions within a center of the image (or, within a center between the blurred regions). These center-estimated and/or -applied blur kernels may effectively reduce (ideally remove) the spatially varying blur of the entire image. Thus, in an example embodiment, the metrics module 930 may apply and/or add a location weight variable to the determined metrics for the regions of the image. For example, the metrics module 930 may calculate and/or otherwise determine a usefulness U'(R), which is the usefulness of the metric described above with an additional location weight variable, as follows:

$$U'(R) = (NumEdgeOrientations(R) + \alpha \cdot AvgGradMag(R)) \cdot ClipWeight(R) \cdot LocWeight(R)$$

where LocWeight(R) is a weighting function for considering an image region around an image center (or, another location within the image), and may be defined as follows:

$$LocWeight(R) = \exp\left(-\frac{|x_R - x_C|^2 + |y_R - y_C|^2}{2\sigma_L}\right)$$

where $(x_R, y_R)$ is the center pixel of the image region R, and $(x_C, y_C)$ is the image center, and $\sigma_L = \max(W_{low}, H_{low})/2$.

In some example embodiments, the metrics module 930 may receive information (e.g., a user input from a mouse, touchpad, touch screen, or the like) that identifies a user-defined location and/or region within the image at which to estimate a blur kernel. The metrics module 930 may define and/or modify the weighting function LocWeight(R) as follows:

$$LocWeight(R) = \exp\left(-\frac{|x_R - x_i|^2 + |y_R - y_i|^2}{2\sigma_L}\right)$$

where $x_i$, $y_i$ is the pixel of the interest that user provided, and $\sigma_L = \max(W_{low}, H_{low})/4$. Accordingly, in an example embodiment, a user may at least partially determine a location at which a blur kernel is to be positioned.

In some example embodiments, the metrics module 930 may determine metrics for regions of varying sizes. For example, small regions (e.g., regions less than a reference size) of an image may include enough characteristics (e.g., edge orientations) to suitably perform blur kernel estimation. The metrics module 930 may then determine metrics for the small regions in order to reduce computation times, avoid regions with corrupted pixels, and so on. Of course, the metrics module 930 may determine metrics for regions within an image based on other processes, techniques, and/or algorithms that include variables associated with edges, edge orientations, and so on, within the regions.

In some example embodiments, the region selection module 940 is configured to select a region based on the determined metrics at which to position the blur kernel during deconvolution of the blurred image. For example, the region selection module 940 may select the region or regions associated with the highest values of the usefulness U(R) and/or U'(R).

In order to identify a suitable region, the region selection module 940 may consider various region sizes (e.g., using a pre-defined set of scale factors) along with the metrics associated with the region sizes. When a suitable region is identified, the region selection module 940 may select the region with the determined scale factor size and ignore other sizes. However, if a suitable region, or a region not meeting defined criteria, is not found, then the region selection module 940 multiplies a next scale factor with the blur kernel size, and selects a region of that size, until a suitable or best region is identified.

For example, the region selection module 940 may locate a region with a large or largest usefulness U(R) or U'(R), and determine whether the usefulness U(R) or U'(R) is greater than a threshold value, $t_u$. The threshold value $t_u$ may define a minimum or sufficient value for the suitability of a region at which to estimate and/or apply a blur kernel. Thus, once the metrics module 930 calculates metrics for some or all regions of an image, the region selection module 940 may select the region or regions having the highest usefulness U(R) or U'(R) and/or any regions with a threshold value $t_u$ above a reference threshold, $t_u$, $t_u$=max(0.75M, 4), which indicates a region is suitable for blur kernel estimation.

Figure 10:
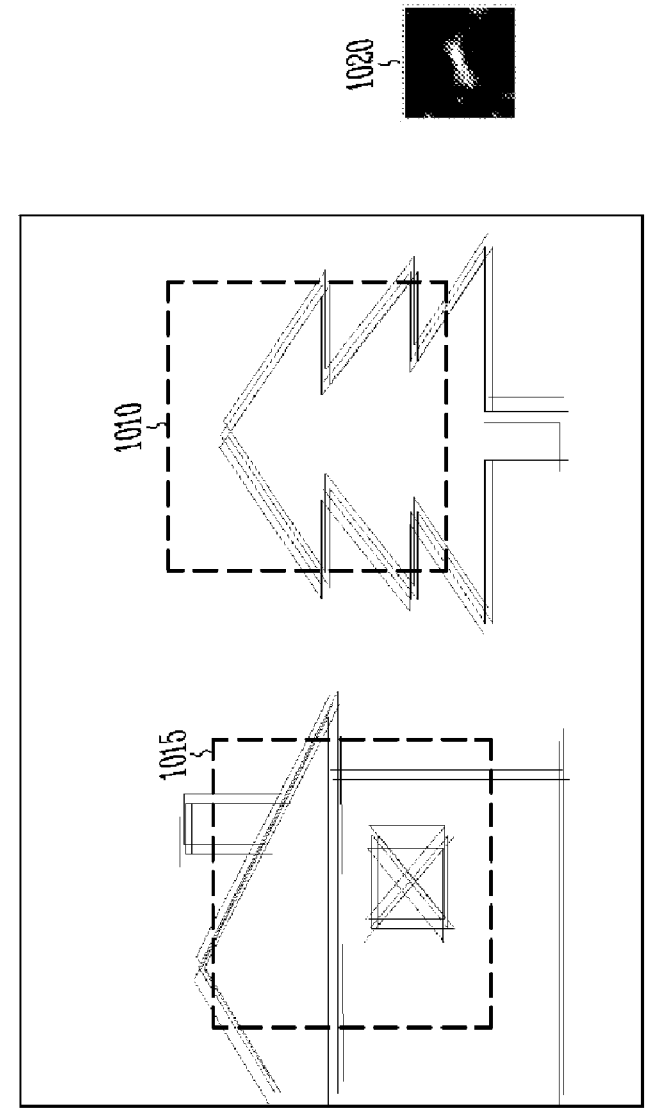
FIG. 10 shows a screen shot of suggested regions, in accordance with an example embodiment, for automatically estimating a blur kernel.

FIG. 10 shows a screen shot 1000 of suggested regions for automatically estimating a blur kernel. More particularly, the screen shot 1000 shows a first region 1010 and a second region 1015 at which to estimate a blur kernel. A blur kernel 1020 may be estimated for the first region 1010, and a blur kernel 1025 may be estimated for the second region 1015. The metrics module 930 may then, for example, determine which of the first and the second regions 1010, 1015 is more suitable for estimating a blur kernel used to deblur the image. For example, the regions may be selected based on a number of edge orientations within each region In an example embodiment, when the determined metrics do not satisfy a threshold metric for selecting the region, the size of the regions may be modified. For example, the size of each of a plurality of regions may be modified, and metrics for each the plurality of regions having a modified size may then be determined. Thereafter, a region having the modified size that is associated with a metric that satisfies the threshold metric for estimating the blur kernel may be selected.

Figure 11:
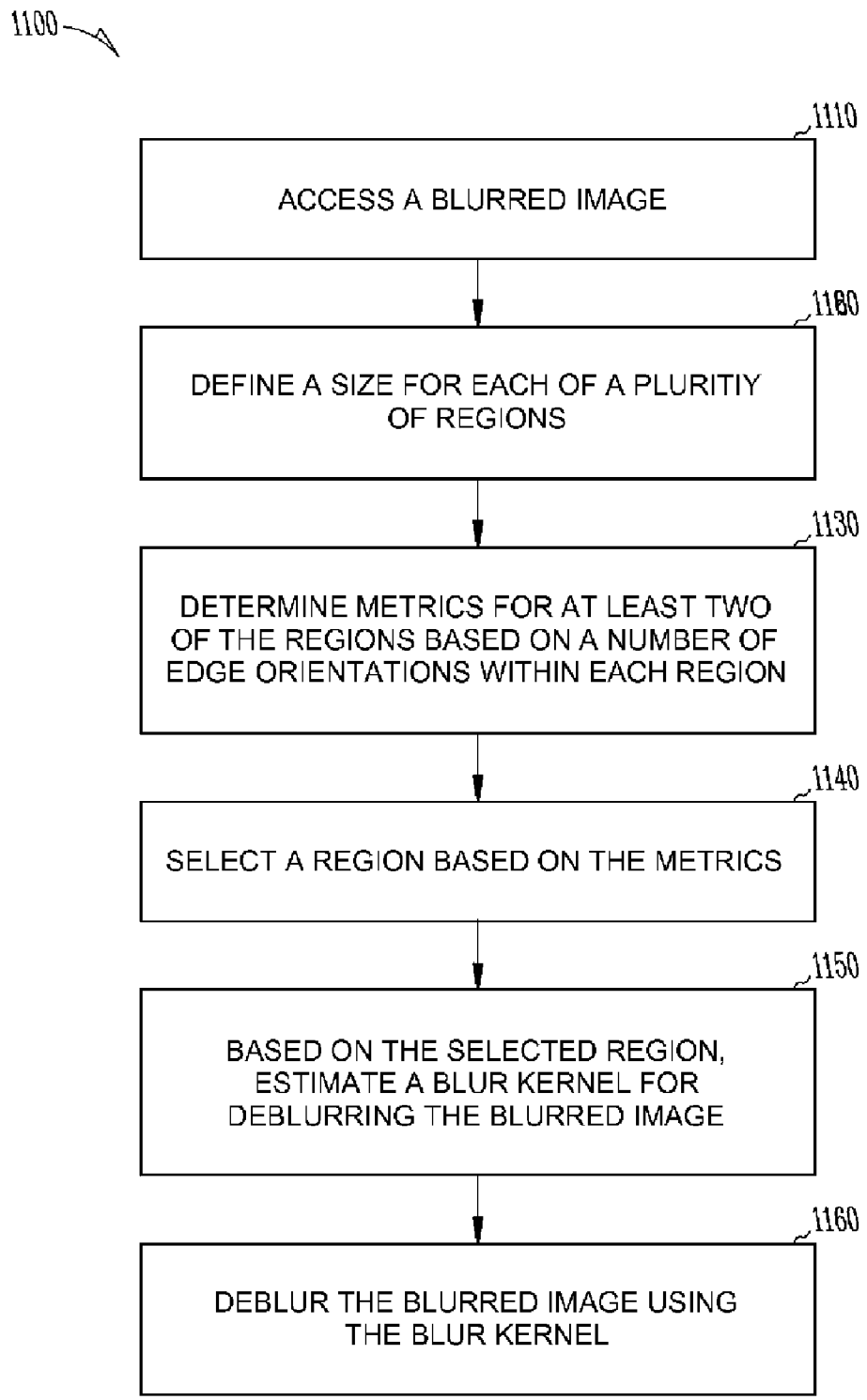
FIG. 11 is a flow diagram of a method, in accordance with an example embodiment, for automatically selecting a region in an image for estimating a blur kernel.

As described herein, in an example embodiment, the region suggestion engine 160 may perform various techniques to automatically select and/or determine a region within an image at which to estimate a blur kernel and/or apply the blur kernel to deblur the image. FIG. 11 is a flow diagram illustrating a method 1100, in accordance with an example embodiment, for selecting a region in an image for estimating a blur kernel. The method 1100 may be performed by the region suggestion engine 160 and, accordingly, is described herein merely by way of example with reference thereto. It will be appreciated that the method 1100 may be performed on any suitable hardware.

In operation 1110, the region suggestion engine 160 accesses a blurred image having a plurality of regions. One or more of the regions may be blurred regions. In an example embodiment, the blurred image may be accessed by the image editing application 135, via the user interface 115 of the user device 110.

In operation 1120, the region suggestion engine 160 defines a size for each of the plurality of regions. In some example embodiments, the region suggestion engine 160 may preprocess the blurred image by downsampling the image with respect to the input blur kernel size, such as a size $N_k \times N_k$. The downsampling may reduce the image size and output a downsampled image $b_{Low}$, having a size $W_{Low} \times H_{Low}$. The downsampling may reduce computational time, may reduce the blur, may reduce noise or artifacts, and so on.

In operation 1130, the region suggestion engine 160 determines metrics for at least two of the plurality of regions, the metrics being based on a number of edge orientations within each region. For example, the metrics module 930 may perform various algorithmic processes described herein to identify image characteristics and/or features associated with suitable regions within the accessed image. In an example embodiment, the suitable regions may have contrast edges of many different edge directions, few or no corrupted pixels (e.g., saturated pixels), and so on. Example metrics may be based on edge orientations, a gradient magnitude, a clip weight, a location weight, and combinations thereof.

Figure 12:
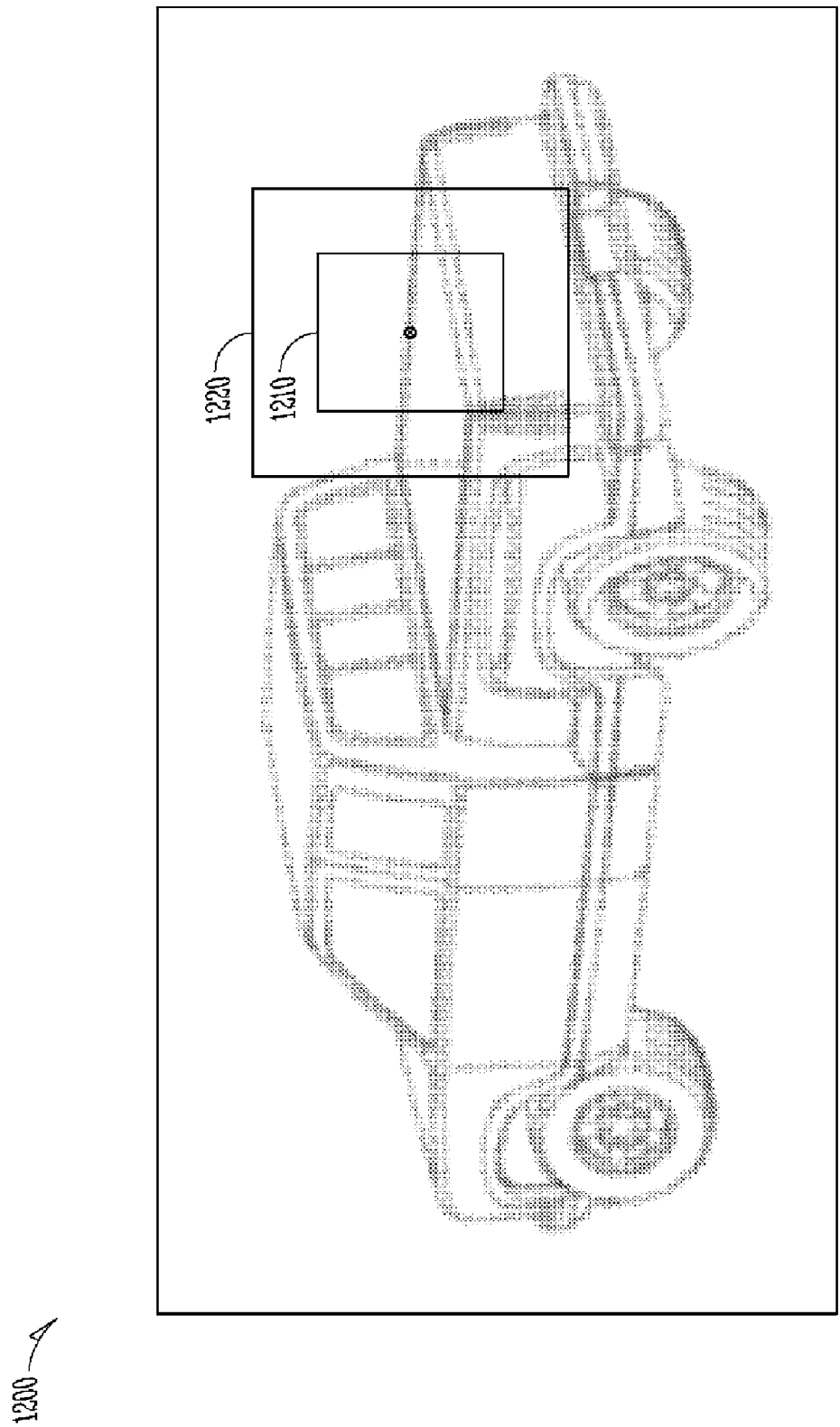
FIG. 12 is an example blurred image showing positioning of a blur kernel at a selected region of the blurred image.

Thereafter, as shown, in operation 1140, the region suggestion engine 160 selects a region, based on the determined metrics, at which to estimate and/or position the blur kernel during deconvolution of the blurred image. For example, the region selection module 940 may select the region or regions associated with the highest usefulness metric U(R) and/or U'(R) values. FIG. 12 is an example of a blurred image 1200 showing positioning of an example blur kernel 1220 at a selected region 1210 of the blurred image 1200.

The method 1100 may then, as shown in operation 1150, estimate a blur kernel for deblurring the image based on the selected region. Thereafter, as shown in operation 1160, the image may be deblurred using the blur kernel.

As described herein, in some example embodiments, the region suggestion engine 160 may identify multiple suitable regions in the blurred image 1200 for blur kernel estimation. To this end, in an example embodiment the region selection module 940 may determine whether any of the identified regions overlap and, if the regions overlap by more than a certain ratio or reference amount, other suitable regions may then be selected for blur kernel estimation.

In some example embodiments, the region suggestion engine 160 may determine a metric for a single region within the image (e.g., a user-defined or center region), and, if the metric indicates the region is suitable for blur kernel estimation, select the single region without calculating metrics for other regions of the image.

Thus, the region suggestion engine 160 may select a region within an image at which to estimate and/or position a blur kernel, in order to deblur the image.

Examples of Deblurring Images having Spatially Varying Blur

Taking handheld photos (e.g., using a smartphone, a mobile device, or a camera) in low-light conditions may be challenging, as longer exposure times are needed, often leading to blurred photos due to the shaking of the camera. Photos taken of scenes having depth variation may have different spatially varying blur, because objects far away from the camera will be less blurred than objects closer to the camera. Accordingly, in an example embodiment, the image editing application 135 may utilize multiple blur kernels to deblur the photos. For example, a blur kernel may be provided for each different blurred region within an image. Because differences between blur kernels for an image with spatially varying blur may be small, the image editing application 135 may deblur a single, local, region within an image using an associated static blur kernel. Different blur kernels may then be used in other regions and the deblurred results may be combined or stitched together to form a final deblurred image (e.g., see FIG. 15).

Figure 13:
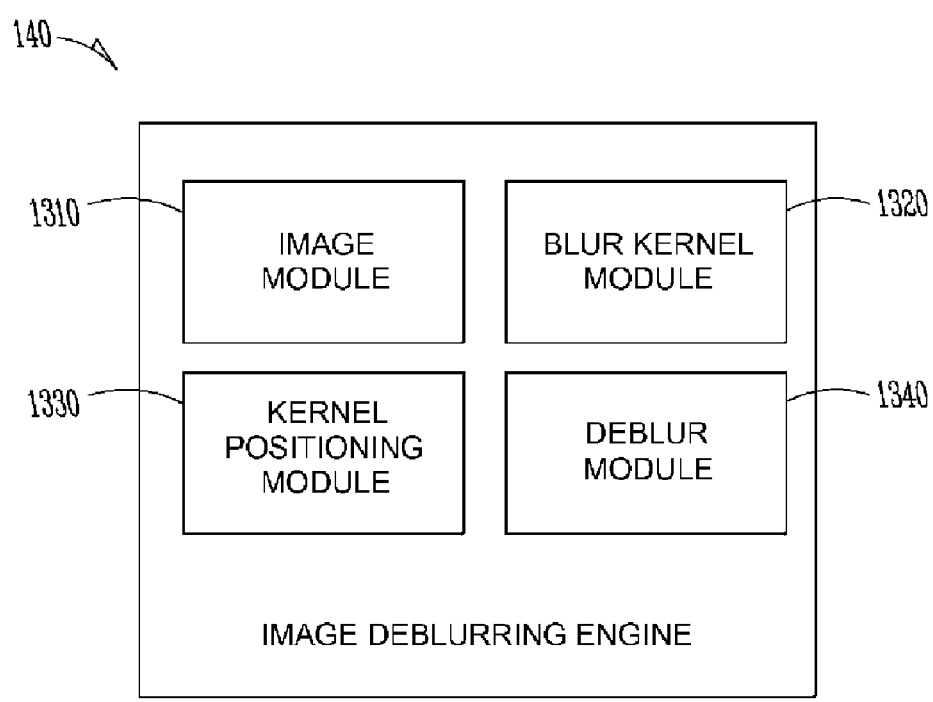
FIG. 13 is a block diagram of example components of an image deblurring engine, in accordance with an example embodiment, to reduce spatially varying blur using multiple blur kernels.

FIG. 13 is a block diagram of example components of an image deblurring engine 140, in accordance with an example embodiment, to reduce (ideally remove) spatially varying blur using multiple blur kernels. In some example embodiments, the image deblurring engine 140 may include one or more modules implemented in hardware, software, or a combination of hardware and software, and that may be executed by one or more processors. The image deblurring engine 140 is shown, by way of example, to include an image module 1310, a blur kernel module 1320, a kernel positioning module 1330, and a deblurring module 1340.

In some example embodiments, the image module 1310 is configured to access an image having multiple blurred regions (e.g., two or more), such as a first blurred region and a second blurred region. For example, the image module 1310, which may be similar to the image module 210 and/or image module 910, may access a blurred image resident on a local device, in the cloud, or otherwise. In an example embodiment, the image module 1310 accesses an image input to the image editing application 135, via the user interface 115 of the user device 110.

In some example embodiments, the blur kernel module 1320 is configured (e.g., programmed) to generate a first blur kernel for the first blurred region and a second blur kernel for the second blurred region. For example, the blur kernel module 1320 may generate and/or determine local blur kernels for some or all of the blurred regions within the image using techniques described herein.

In some example embodiments, the image editing application 135 may provide a graphical user interface (GUI), such as one or more of the various user interfaces described herein, configured to receive input from a user that specifies local regions within the image for blur kernel estimation. For example, in response to a user providing input (e.g., drawing a box on the image via the GUI, centered at (x, y)), the blur kernel module 1320 may analyze the image content within the identified region to estimate a static or local blur kernel K for the region. The blur kernel module 1320, which may use various techniques for generating blur kernels, such as those described herein, may then create a list of local kernels $K_1, K_2, \ldots, K_n$, which are created from regions centered at $(x_1, y_1), (x_2, y_2), \ldots, (x_n, y_n)$. In other example embodiments, the image editing application 135 may perform the techniques described herein to automatically suggest the local regions for kernel estimation. Thus, the blur kernel module 1320 may generate a group of local blur kernels that are used to at least partially (ideally satisfactorily) deblur a local region. Thus, a single blur kernel is not used to deblur all blurred regions of entire image.

In some example embodiments, the kernel positioning module 1330 is configured to position the first blur kernel with respect to the first blurred region and position the second blur kernel with respect to the second blurred region based on the position of the first blur kernel. For example, the kernel positioning module 1330 may align the local blur kernels with respect to each other.

Given a list of generated blur kernels, $K_1, K_2, \ldots, K_n$, which correspond to local blurred regions within the image, the kernel positioning module 1330 may identify a blur kernel $K_c$ having a center position $(x_c, y_c)$ that is closest to a center of the image or closest to a focal point of the image (e.g., a focal point identified from metadata associated with the image). Thereafter, the remaining blur kernels are positioned relative to the blur kernel $K_c$, which may define a center kernel or base kernel.

For example, for a local blur kernel $K_r$ that is created from a region centered at $(x_r, y_r)$, the kernel positioning module 1330 may identify an optimal shift $(\delta_x^*, \delta_y^*)$ as follows:

$$(\delta_x*, \delta_y*) = \operatorname{argmax}_{\delta x, \delta y} \sum_{x,y} K_c(x, y) \cdot K_r(x + \delta x, y + \delta y)$$

where x, y iterate over all pixels in the kernel. In example embodiment, the kernel positioning module 1330 may thus ideally determine an optimal shift between the blur kernel $(x_r, y_r)$ and the base kernel $K_c$ that results in an enhanced (ideally a maximum or high) correlation between the base kernel $K_c$ and the local blur kernel $K_r$.

In some example embodiments, the deblurring module 1340 is configured (e.g., programmed) to deconvolve the first blurred region with the first blur kernel and deconvolve the second blurred region with the second blur kernel. For example, the deblurring module 1340 may perform tile-based multi-kernel deconvolution to deblur the entire image using the aligned, local, static kernels. Tile-based multi-kernel deconvolution may comprise dividing up a blurred image into a plurality of regions or tiles that do not overlap. In an example embodiment, the tiles may be rectangular or square tiles that are arranged in a grid. For example, the tile size can be a fixed number, such as 512 by 512 pixels.

In an example embodiment, the deblurring module 1340 uses each local kernel $K_i$ to generate a deconvolution result $L_i$ for each local region (e.g., tile) of the image, and may blend the deconvolution results ($L_i$s) together, using various techniques, to form a final, deblurred image.

Figure 14:
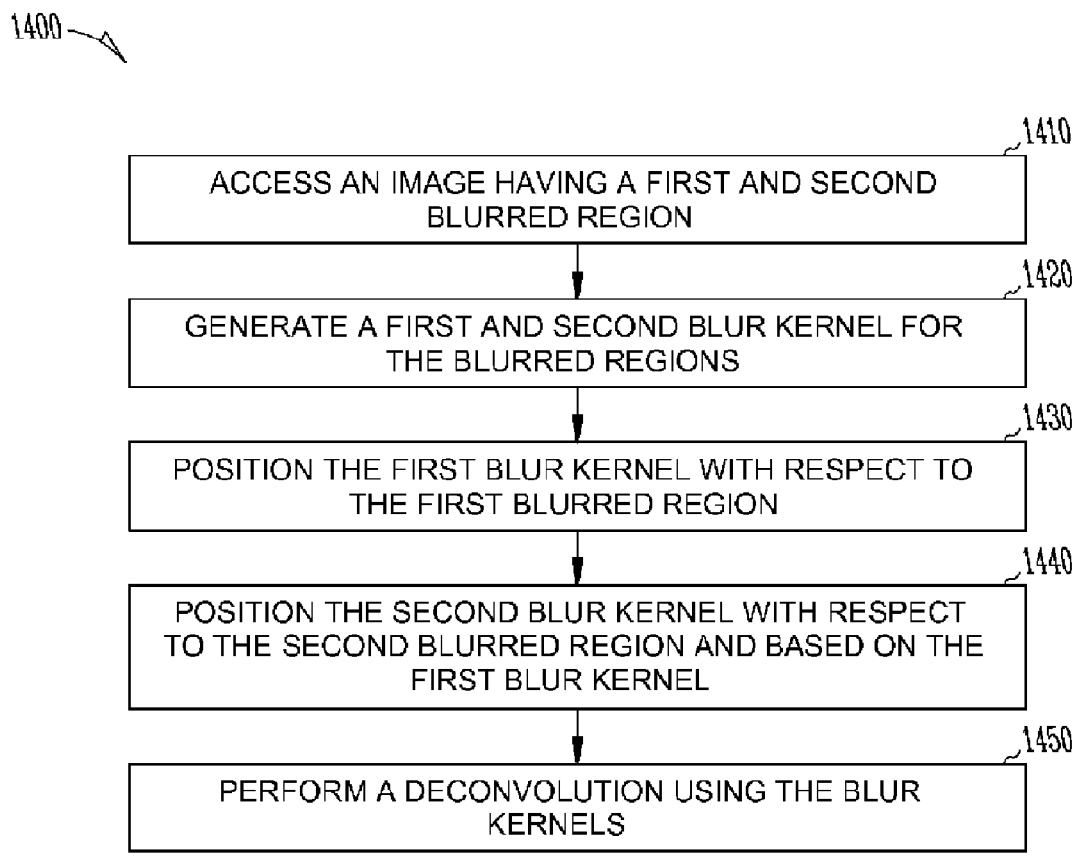
FIG. 14 is a flow diagram of a method, in accordance with an example embodiment, for deblurring a blurred image.

FIG. 14 is a flow diagram illustrating a method 1400, in accordance with an example embodiment, for deblurring a blurred image. The method 1400 may be performed by the image deblurring engine 140 and, accordingly, is described herein merely by way of example with reference thereto. However, it will be appreciated that the method 1400 may be performed on any suitable hardware.

The method 1400 is shown to commence at operation 1410 wherein the image deblurring engine 140 accesses an image having a first blurred region (e.g., centered at $(x_1, y_1)$) and a second blurred region (e.g., centered at $(x_2, y_2)$). Thus, the image module 1310 may access a blurred image having spatially varying blur, such as two or more blurred regions that are spatially offset.

Thereafter, in operation 1420, a first blur kernel (e.g., $K_1$) is generated for the first blurred region and a second blur kernel (e.g., $K_2$) is generated for the second blurred region. When multiple blurred regions are present, the blur kernel module 1320 may generate further local blur kernels for each of the blurred regions within the image. The first blur kernel is positioned with respect to the first blurred region, and the second blur kernel is positioned with respect to the second blurred region based on the position of the first blur kernel (see operations 1430 and 1440). For example, the kernel positioning module 1330 may consider the first blur kernel as a base or center kernel, and locate, position, and/or align the second blur kernel with respect to non-zero elements of the first blur kernel such that an optimal shift between the second blur kernel and the base kernel is maximized or highly correlated.

Figure 15:
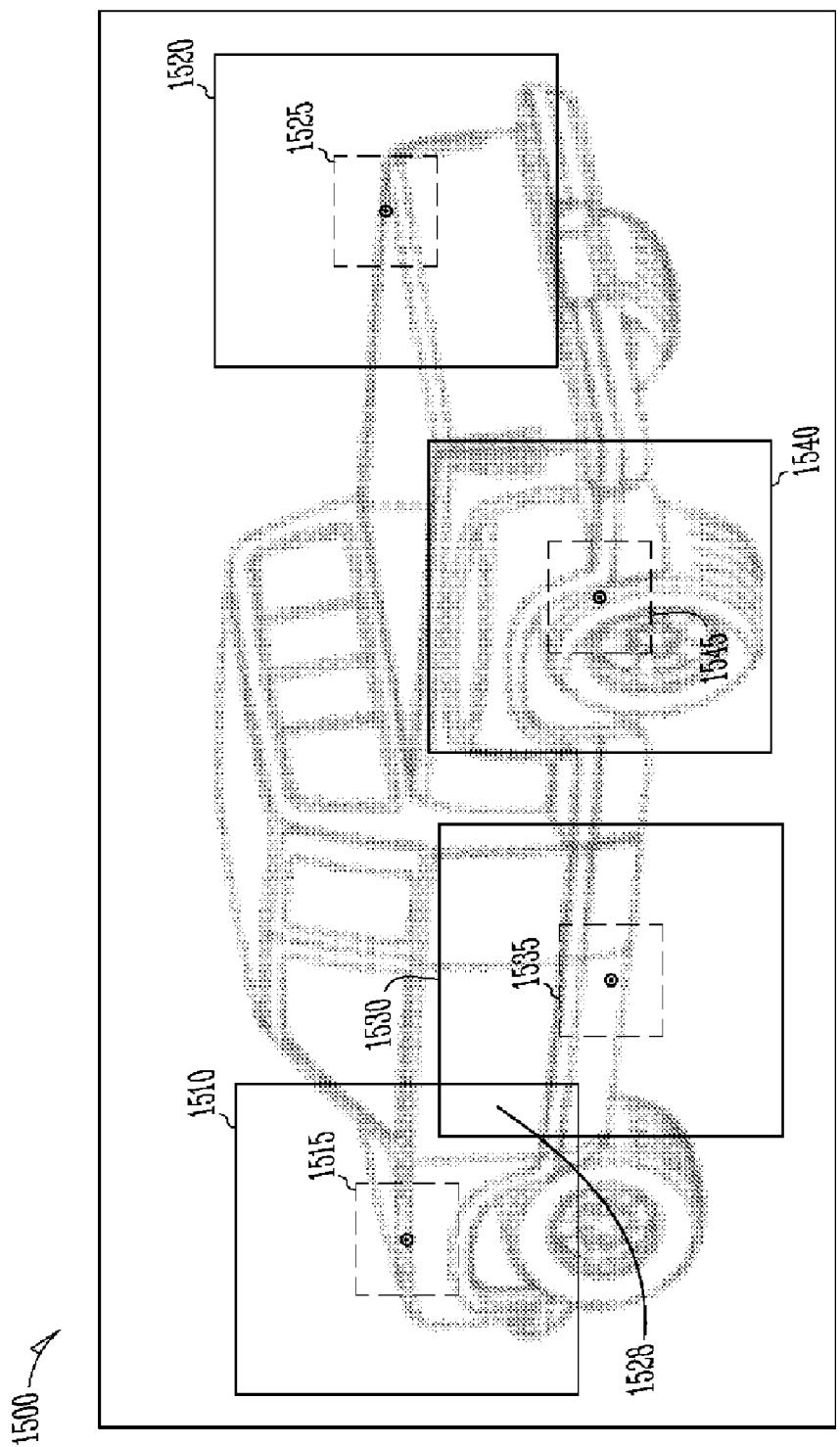
FIG. 15 is an example blurred image showing positioning of multiple blur kernels, in accordance with an example embodiment, at multiple blurred regions of the image.

FIG. 15 is an example blurred image 1500 showing positioning of multiple blur kernels, in accordance with an example embodiment, at multiple blurred regions of the image 1500. As shown by way of example, a blur kernel 1515 is positioned proximate to a region 1510, a blur kernel 1525 is positioned proximate to a region 1520, a blur kernel 1535 is positioned proximate to a region 1530, and a blur kernel 1545 is positioned proximate to a region 1540. Although the method 1400 is described with reference to two blur kernels, it is to be appreciated that multiple blur kernels may be utilized (e.g., four blur kernels are shown by way of example in FIG. 15).

As shown in operation 1450, the image may be deblurred by deconvolving the first blurred region (e.g., region 1510) with the first blur kernel (e.g., blur kernel 1515) and deconvolving the second blurred region (e.g., region 1520) with the second blur kernel (e.g., blur kernel 1525). For example, the deblurring module 1340 may generate a deconvolution result for the first blurred region and generate a deconvolution result for the second blurred region, and blend the results to create a final, deblurred image. In a similar fashion, deconvolution of further blur kernels and further blurred regions may take place (e.g., regions 1530 and 1540 with blur kernels 1535 and 1545). Deconvolution, as described herein, is intended to include a reverse operation of a convolution operation, and, therefore, may reverse, change, and/or modify blur, distortion, or other imperfections in images.

Figure 16A:
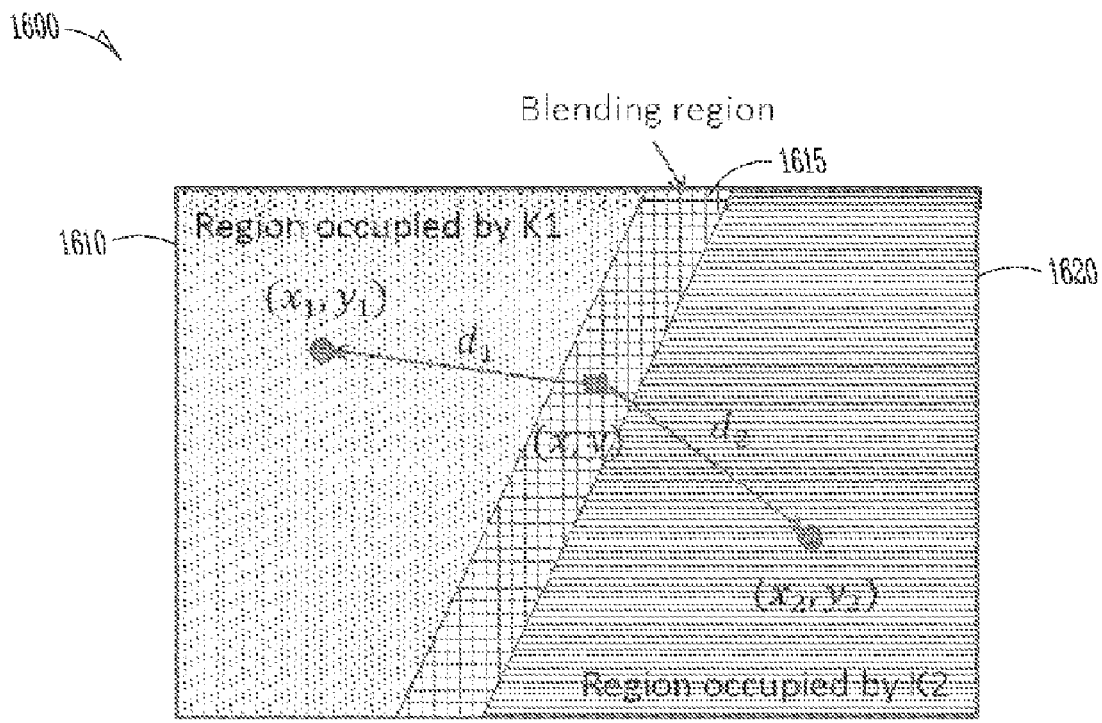
FIG. 16A shows a blending region, in accordance with an example embodiment, between a first region, occupied by a first blur kernel, and a second region occupied by a second blur kernel, wherein the first and second regions overlap.

In the example blurred image 1500, blurred regions 1510 and 1530 are shown by way of example to overlap in region 1528. In such circumstances where two or more blurred regions overlap, the deblurring module 1340 may perform a variety of different techniques when blending deconvolution results to create a final, deblurred image. For example, FIG. 16A shows a diagram 1600 that displays a blending region 1615 between a first region 1610 occupied by a first blur kernel (e.g., blur kernel $K_1$) and a second region 1620 occupied by a second blur kernel (blur kernel $K_2$), wherein the first and second regions 1610, 1620 overlap. The first region 1610 is shown to be centered at $(x_1, y_1)$ in the image and the second region 1620 is centered at $(x_2, y_2)$ in the image. For example, using the methodology described herein, deconvolution results $L_1$ and $L_2$ may be determined using blur kernels $K_1$ and $K_2$, having centers at pixels $(x_1, y_1)$ and $(x_2, y_2)$, respectively, in the blurred image.

For any given pixel (x, y), in an overlapping or blending region 1615, the deblurring module 1340 may assign two different weights, $w_1$ and $w_2$, and determine a color for the pixel (x, y) as follows:

$$C(x, y) = w_1 L_1(x, y) + w_2 L_2(x, y),$$

which is a linear interpolation between the two resultant images $L_1$ and $L_2$ that include the pixel.

To determine the weights, a spatial distance between the pixel and the two kernel centers $((x_1, y_1), (x_2, y_2))$ may be calculated. The spatial distance may be denoted by $d_{a1}$ and $d_{a2}$, and the weights may be computed as follows:

$$w_1 = 1, w_2 = 0 \quad \text{if } d_1 + D < d_2$$
$$w_1 = 0, w_2 = 1 \quad \text{if } d_2 + D < d_1$$
$$w_1 = 0.5 - \frac{d_1 - d_2}{2D}, w_2 = 1 - w_1, \quad \text{else}$$

where D is a distance threshold, (e.g., 20 pixels). Thus, when the given pixel (x, y) is close to the center of kernel K1 in the first region 1610, but is far away (e.g., greater than a reference distance) from the center of kernel K2 in the second region 1620, then $w_1=1$ and $w_2=0$, the pixel will have a color similar to the color of $L_1$. On the other hand, when the pixel is far away from the center of kernel K1, and is close to the center of kernel K2, the pixel may have a color similar to the color of $L_2$. However, when the pixel is located within the blending region 1615, having a width D and located between the two kernels K1, K2, the pixel at (x, y) will have a color that is a linear blend of the corresponding colors from $L_1$ and $L_2$. Thus, the deblurring module 1340 may linearly blend resultant image portions $L_1$ and $L_2$ and perform a final deconvolution result for the entire image. It should be noted that, in other embodiments, other interpolation techniques are utilized.

In some example embodiments where a pixel is common to more than two kernels, blending weights may be determined for all kernels that include the pixel. For example, given m kernels $K_1, K_2, \ldots, K_m$, weights between any pair of kernels as $w_{ij}$, $i, j \in \{1, \ldots, m\}$ may be determined. For example, the deblurring module 1340 may determine an un-normalized weight $w_i$ for Kernel i as follows:

$$w_i = w_{i1} \cdot w_{i2}, \ldots, w_{im}$$

The deblurring module 1340 may then normalize the weights using the sum of the un-normalized weights as:

$$w'_i = \frac{w_i}{\sum_{i=1}^{m} w_i}$$

and utilize the weights to linearly blend the pixel colors of all $L_i$s for the pixel. This weighting functionality may, for example, be applied to the example kernels 1515, 1525, 1535 and 1545 of the blurred image 1500 (see FIG. 15).

Figure 16B:
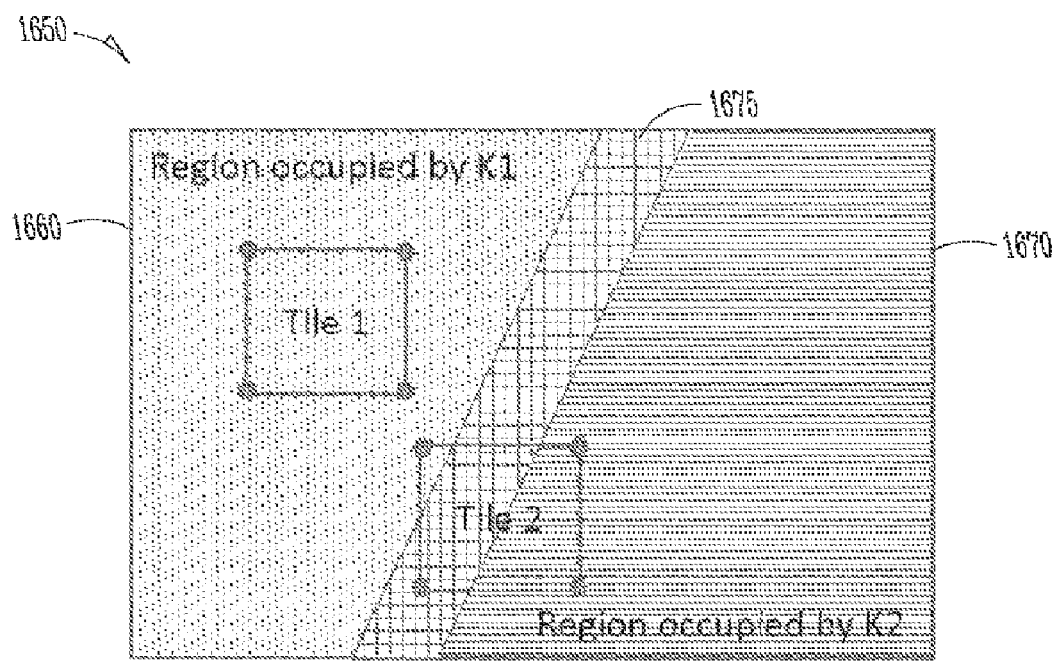
FIG. 16B is a schematic diagram illustrating a tile-based blending arrangement, in accordance with an example embodiment.

In some example embodiments, the deblurring module 1340 may utilize an efficient, tile-based blending technique, where tiles (e.g., groups of pixels) are blended between kernels. An example of a tile-based blending is shown in FIG. 16B. More particularly, FIG. 16B shows a diagram 1650 that displays a blending region 1675 between a first region 1660 occupied by a first blur kernel K1 and a second region 1670 occupied by a second kernel K2. An image tile (e.g., Tile 1 or Tile 2) may be defined having four corner locations at P1, P2, P3 and P4. Blending weights may then be determined for the four corner locations P1, P2, P3 and P4. When the four corner locations P1, P2, P3 and P4 are located in a single (the same) kernel (e.g., have a weighted value of 1 for the same kernel, and have a weighted value 0 for all other kernels), it is assumed that the tile is located entirely within a single kernel region (e.g., Tile 1), and the single kernel is then used to deconvolve the entire tile.

However, when the four locations P1, P2, P3 and P4 of the corners have different weights for different kernels, the tile may then be assumed to be located within two or more kernel regions (e.g., Tile 2). The weights of the four corner locations P1, P2, P3 and P4 may be examined in order to identify all kernels that have non-zero weights with the tile, determine the corresponding blending results for the kernels, and linearly blend the kernels in order to deblur the entire image with smooth transitions in color between different regions of the image.

Thereafter, the deblurring module 1340 may stitch regions together, using various techniques to form complete deblurred images. Stitching regions together may include computing multiple colors for a pixel, each associated with an estimated blur kernel, and finally computing a weighted average of these colors as its final color.

Thus, in some example embodiments, the image deblurring engine 140 may deblur an image having spatially varying blur using multiple kernels and wherein the kernels may be aligned with respect to one another. Blending regions within the image that include pixels associated with multiple kernels may be deconvolved using weights that are dependent upon pixel distances from local kernels.

Examples of Graphical User Interfaces for Managing Blur Kernels

In an example embodiment, a display interface and a method for presenting editing controls for deblurring an image are provided. The display interface and the method may form part of the image editing application 135 and, various user interface screens may be provided that facilitate the management of blur kernels used to deblur images.

Figure 17:
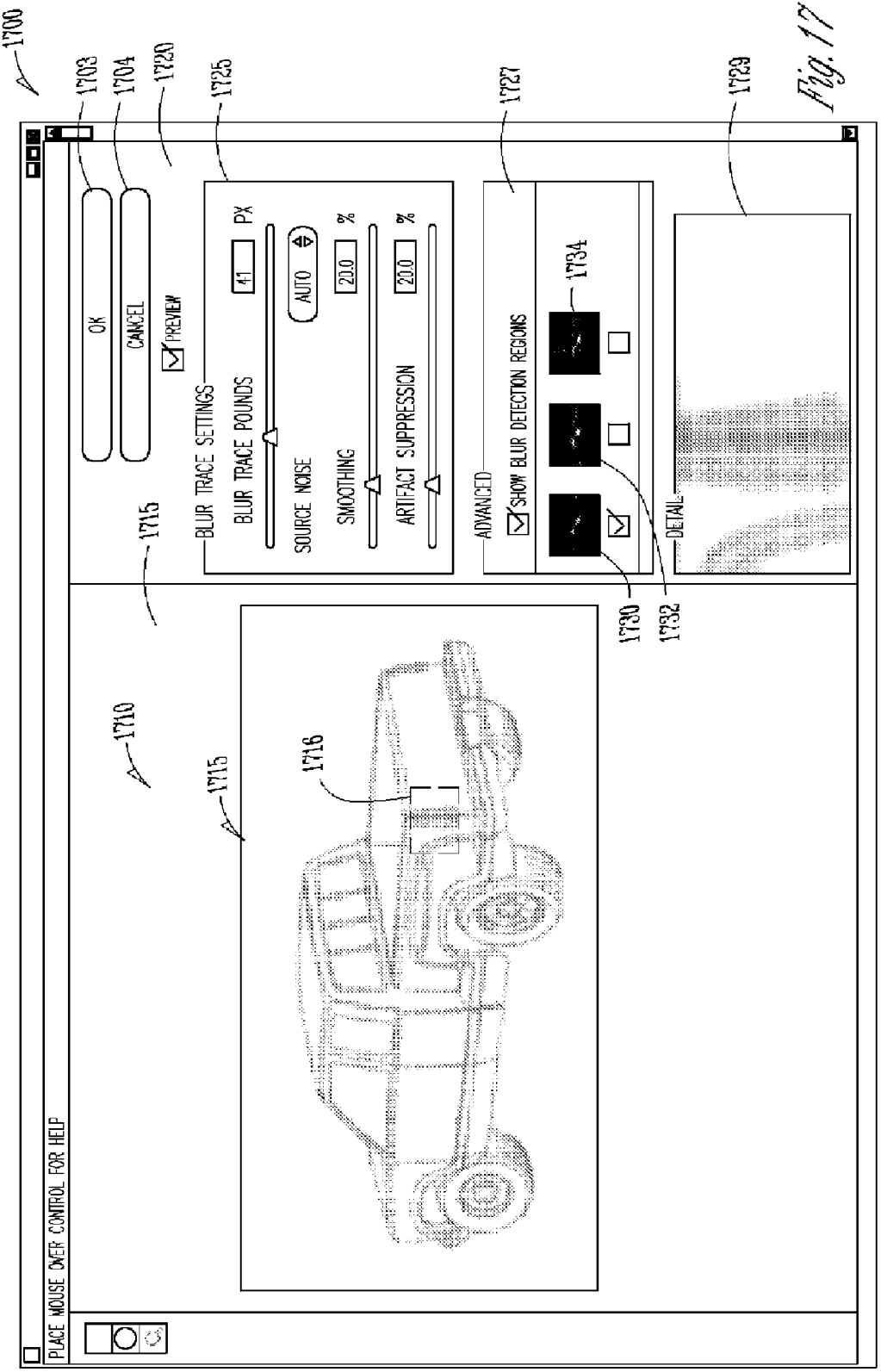
FIG. 17 shows a graphical user interface (GUI), in accordance with an example embodiment, for editing images.

Referring to FIG. 17, a graphical user interface (GUI) 1700, in accordance with an example embodiment, is provided for editing images (e.g., photos in a photo library). The GUI 1700 may be displayed on a mobile device (e.g., a tablet computer, smartphone or the like) or any other computing device. The GUI 1700 is shown to include a display zone 1710 that displays an image 1715, such as a blurred image, and a control zone 1720 that includes various user input controls or features that are used to deblur and/or otherwise edit the image 1715. For example, the control zone 1720 is shown to include various blur trace settings 1725, a blur kernel zone 1727, and an image detail zone 1729. The blur kernel zone 1727 is shown by way of example to include a blur trace pounds slider, which may specify a size of the blur kernel (e.g., if the slider is set to 41, then the size of the blur kernel is set to 41×41 pixels), a smoothing slider, which may specify how smooth the deblurred result will be, or how much noise is suppressed in the deblurred result, and an artifact suppression slider, which may specify how much of the deblurring artifacts (e.g., ringing artifacts, will be suppressed). In other example embodiments, different and/or additional settings are provided using sliders and/or other adjustment arrangements. The blur kernel zone 1727 is shown, by way of example, to display three visualizations of blur kernels. More particularly, blur kernels 1730, 1732 and 1734 may be applied to the image 1715 to deblur blurred regions of the image 1715. In an example embodiment, the blur kernels 1730, 1732 and 1734 are generated using the methods described herein. The image detail zone 1729 shows an exploded view of a region 1716 of the image 1715.

Figure 18:
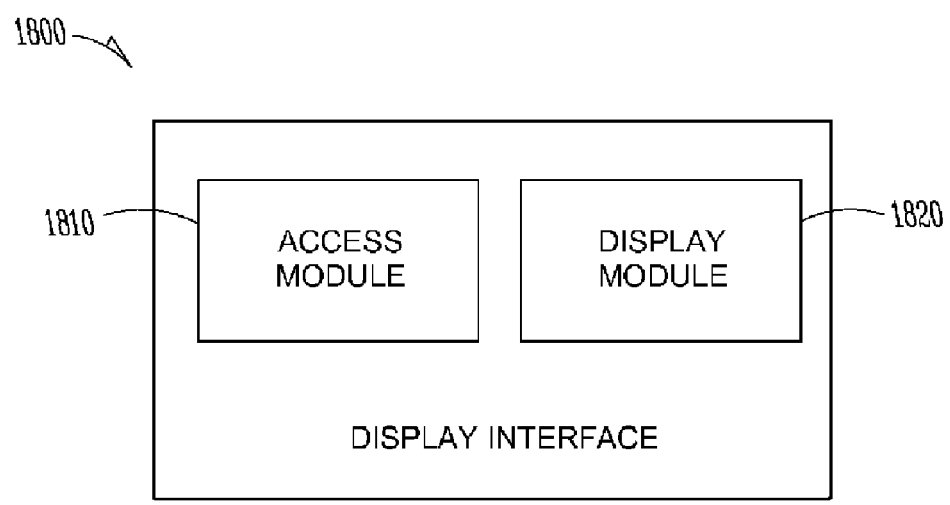
FIG. 18 is a block diagram of example components of a display interface, in accordance with an example embodiment.

In some example embodiments, parameters or aspects (e.g., size) of the blur kernels 1730, 1732 and 1734, that are displayed within the blur kernel zone 1727, are automatically configured or defined without user input. Further, regions in the image 1715 (e.g., the blurred region 1716) at which to apply blur kernels (e.g., the blur kernels 1730, 1732 and 1734) may be automatically determined and identified using the techniques described herein. Examples of components of a display interface that generates the GUI 1700 are shown in FIG. 18.

More particularly, a display interface 1800, in accordance with an example embodiment, is shown by way of example to include an access module 1810 and a display module 1820. The access module 1810 is configured (e.g., by a processor executing instructions) to access a blurred image (e.g., access image data defining pixels of an image), and the display module 1820 is configured by at least one processor to display a graphical user interface for deblurring regions of the image. In an example embodiment, the display interface 1800 may generate the GUI 1700 and, accordingly, the display module 1820 may be configured to cause the display of the display zone 1710 and the control zone 1720 adjacent to the display zone 1710. It should be noted that the position of the control zone 1720 relative to the display zone 1710 may vary from one embodiment to another. Thus, the control zone 1720 may be below, on top of, or otherwise positioned relative to the display zone 1710. The display module 1820 is configured to display a user selected image (e.g., the blurred image 1715), display one or more suggested blur kernels (e.g., the blur kernels 1730, 1732 and 1734) in the control zone 1720, and display an association between a selected blur kernel and a blurred region (e.g., the blurred region 1716). The access module 1810 and the display module 1820 may be implemented in hardware, software, or a combination of hardware and software, and may be executed by one or more processors. In some example embodiments, the access module 1810 is configured to access a blurred image stored locally and/or remotely. For example, the access module 1810 may be similar to the image module 210, the image module 910, and/or image module 1310.

The display module 1820 may cause the blurred image 1715 to be displayed within the display zone 1710, as well as an indication of an automatically suggested region (e.g., the blurred region 1716) at which to estimate and/or apply a blur kernel. The display module 1820 may also be configured to cause the display of user input controls to allow a user to edit and deblur images. For example, the display module 1820 may cause various editing buttons, sliders or the like to be displayed within the control zone 1720 that are used to edit the image 1715. In an example embodiment, proposed blur kernels are automatically generated and displayed in the blur kernel zone 1727, and the display module 1820 monitors user interaction with the GUI 1700 and deblurs the blurred image 1715 responsive to the user interaction. In an example embodiment, the display module 1820 may render and/or cause blur kernels to be displayed within the blur kernel zone 1727, and/or cause the blur trace settings 1725 to be displayed within the control zone 1720.

Figure 19:
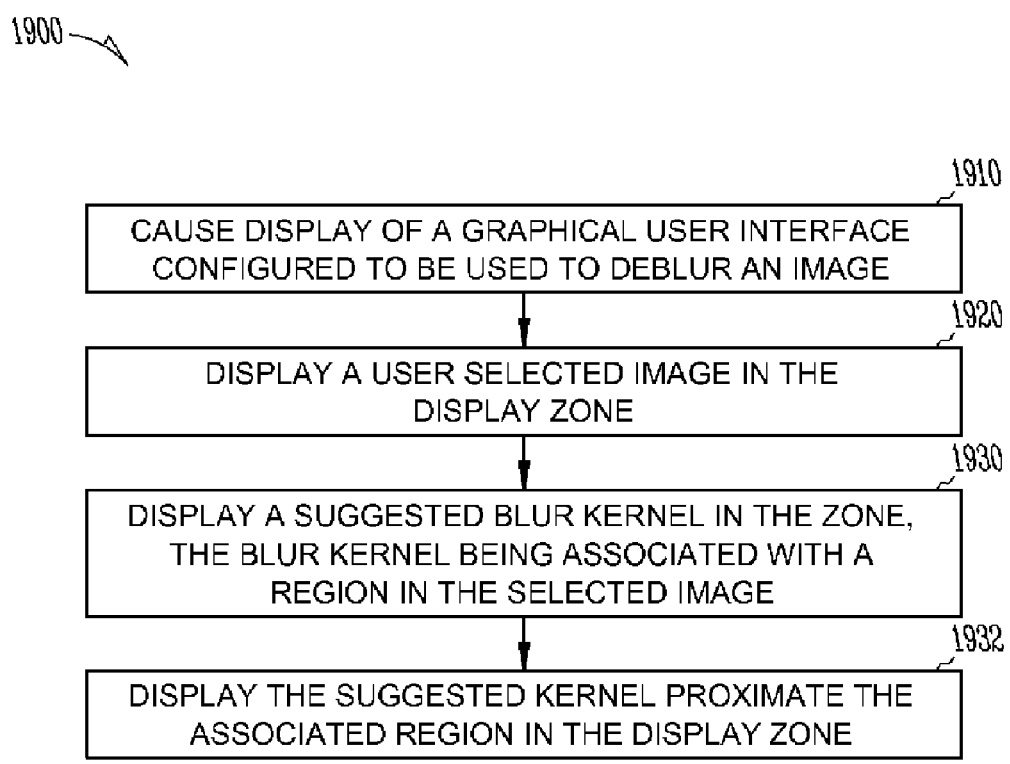
FIG. 19 is a flow diagram of a method, in accordance with an example embodiment, for presenting user editing controls for deblurring an image.

FIG. 19 is a flow diagram of a method 1900, in accordance with an example embodiment, for presenting editing controls for deblurring an image. The method 1900 may be performed by the image editing application 135 and/or the display interface 1800 and, accordingly, is described herein merely by way of reference thereto. It will be appreciated that the method 1900 may be performed on any suitable hardware.

The method 1900, in operation 1910, causes display of a graphical user interface configured to be used to deblur an image. The graphical user interface may include a display zone and a control zone adjacent to the display zone. A user selected image is displayed in the display zone as shown in operation 1920. Thereafter, a suggested blur kernel is displayed in the control zone (see operation 1930), the blur kernel being associated with a blurred region in the selected image. In an example embodiment, in addition to displaying the blur kernel (or a plurality of blur kernels) in the control zone, the suggested blur kernel is also displayed proximate the associated blurred region in the display zone (see operation 1832).

Displaying the suggested blur kernel proximate the associated region may comprise overlaying the blur kernel on the blurred region. Further, the method 1900 may display a plurality of blur kernels in the control zone (e.g., see FIG. 17) wherein each of the plurality of blur kernels is associated with a corresponding blurred region, as described in further detail below. As described herein, in some example embodiments, the image editing application 135, via the GUI 1700, provides various user input controls (e.g., controls of control zone 1720) that facilitate management of blur kernels.

Figure 20A:
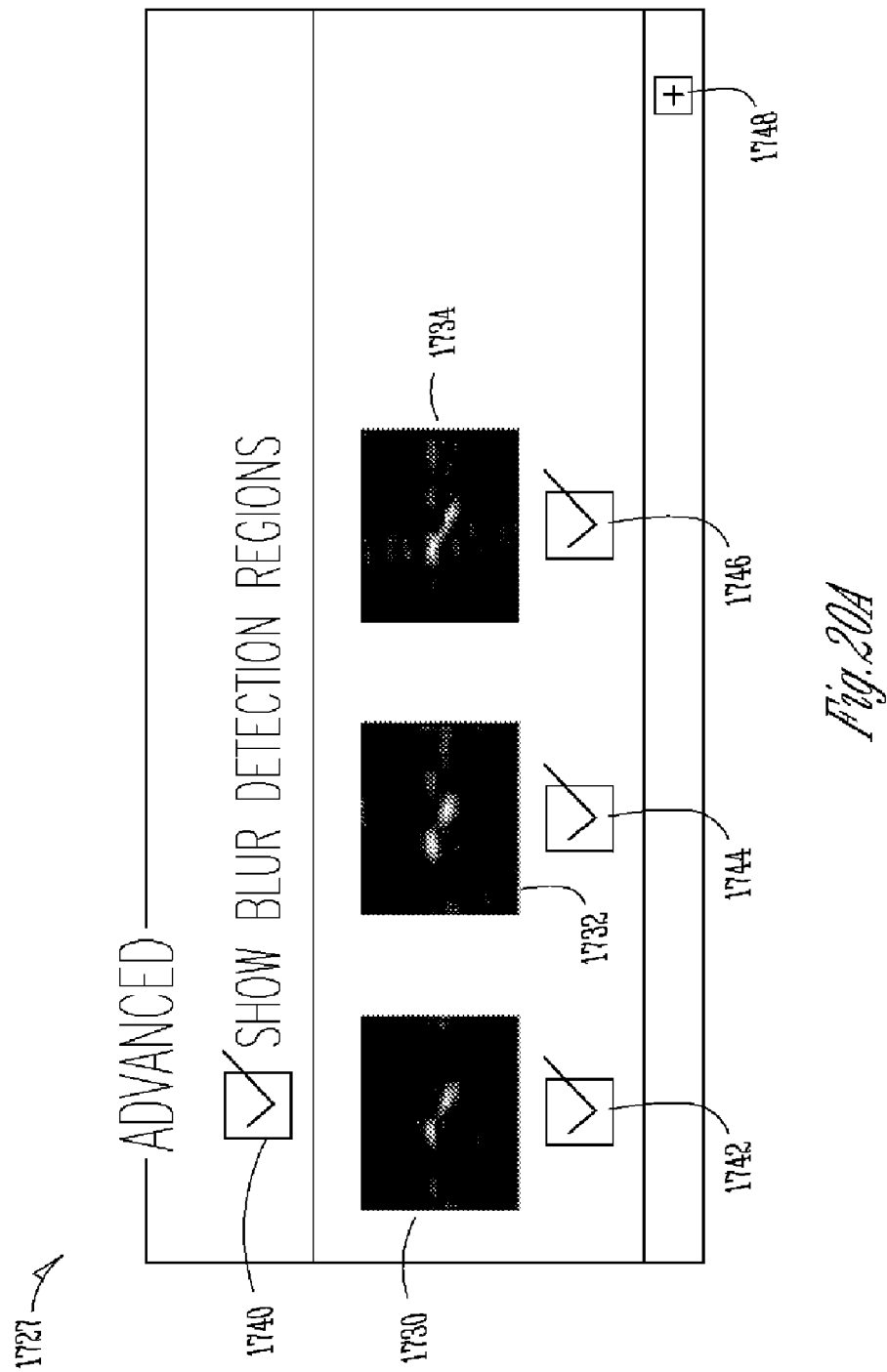
FIGS. 20A-20C are exploded views of a blur kernel zone of the GUI of FIG. 17.
Figure 20B:
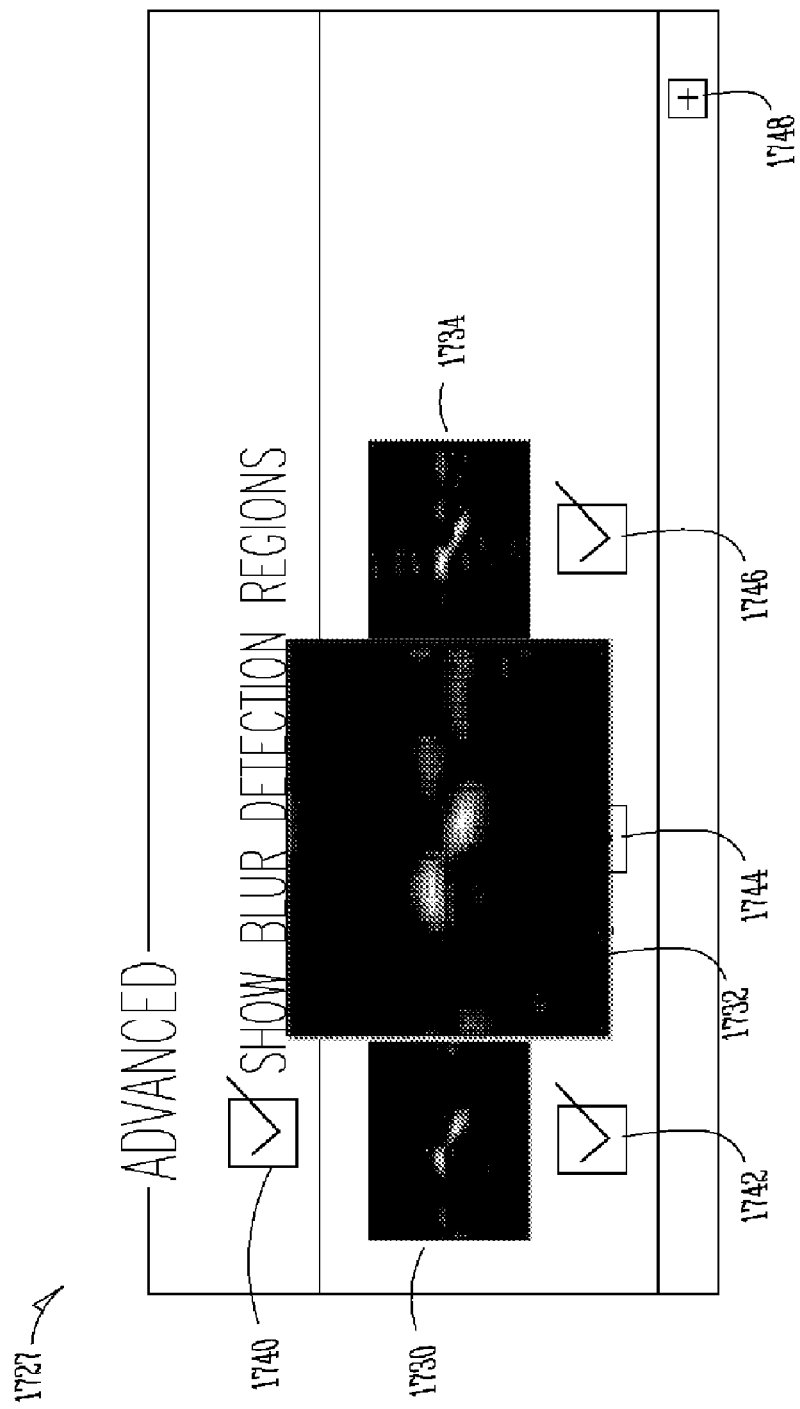

In some example embodiments, the GUI 1700 may provide visual elements and/or objects associated with some or all of the blur kernels to be utilized in deblurring an image. For example, the blur kernel zone 1727 may provide a kernel thumbnail list in which all kernels are represented by "thumbnails" of kernel images. The blur kernel zone 1727 may provide visualizations for all blur kernels as well as their relationship with the image 1715. FIGS. 20A-20B are exploded views of the blur kernel zone 1727 of the GUI 1700 shown FIG. 17. The blur kernel zone 1727 is shown to include three blur kernels but it is to be appreciated that fewer or more blur kernels may be present. Further, in order to select or deselect a particular blur kernel 1730, 1732 or 1734, checkboxes 1742, 1744 and 1746 are provided. Hence, using the GUI 1700, a user may manage which blur kernels are used to deblur various blurred regions in an image. In order to allow a user to add further blur kernels, an add feature in the form of a "+" button 1748 is provided. When the user clicks on the "+" button a further blur kernel is added to the blur kernel zone 1727. Likewise, the GUI 1700 may include a feature (e.g., a button) to remove blur kernels from the blur kernel zone 1727. The parameters (e.g., size, location, etc.) may be automatically determined using the methodologies described herein. When a checkbox 1740 is selected, then regions in the image (e.g., the blurred region 1716) that correspond to a blur kernel are shown. In some example embodiments, as shown in FIG. 20B, when a user selects or otherwise identifies (e.g., by a mouse cursor hovering over) a blur kernel, the blur kernel is enlarged. In FIG. 20B blur kernel 1732 is shown to be enlarged.

In an example embodiment, drag-and-drop functionality is provided that allows a user to drag a blur kernel (e.g., one or more of the blur kernels 1730, 1732 and 1734) and drop it at a position or location in the blurred image 1715. Deblurring of the image may then be automatically performed. In an example embodiment, a user may identify a blurred region in the display zone 1710 (e.g., the blurred region 1716) using a pointer of a mouse, a finger on a touch screen, or the like), and suggested blur kernels for the selected blurred region may then be automatically determined and displayed in the blur kernel zone 1727. Estimation of the size and other parameters of the blur kernel may be done using any of the methodologies described herein. The GUI 1700 may provide controls to create, edit, and/or delete blur kernels (e.g., see buttons 1702 and 1704 in FIG. 17). In an example embodiment, the user may draw a rectangle around a blurred region of the image to select the blurred region. Thus, in an example embodiment, a blur boundary indicator and a kernel boundary indicator may be displayed on the selected image. The blur boundary indicator may identify a size of the blurred region to be processed, and the kernel boundary indicator may identify a size of the associated blur kernel. Accordingly, in an example embodiment, the blur boundary indicator and the kernel boundary indicator may show the relative sizes of the blurred region and the blur kernel.

In some example embodiments, the image editing application 135 may automatically suggest the region and create the blur kernel for the region, as described herein. For example, the image editing application 135 may identify a preferable (ideally best) region within the image at which to estimate the blur kernel. Accordingly, the functionality described in the method 300, wherein a suggested size for a blur kernel is determined, may be performed using the example GUI 1700. The GUI 1700 may also be used in performing the other methodologies described herein.

In some example embodiments, the GUI 1700 may provide interactive elements and/or indicators that reveal regions within an image that are associated with a blur kernel. Example indicators may include indicators that identify whether a kernel is activated (e.g., a box is checked next to the kernel or a circle within a center of a box identifying a region is highlighted), a blur selection ring around a blur kernel is displayed, the blur kernel and/or the associated region is highlighted in response to a mouse hovering over the region or the blur kernel, and so on.

Figure 20C:
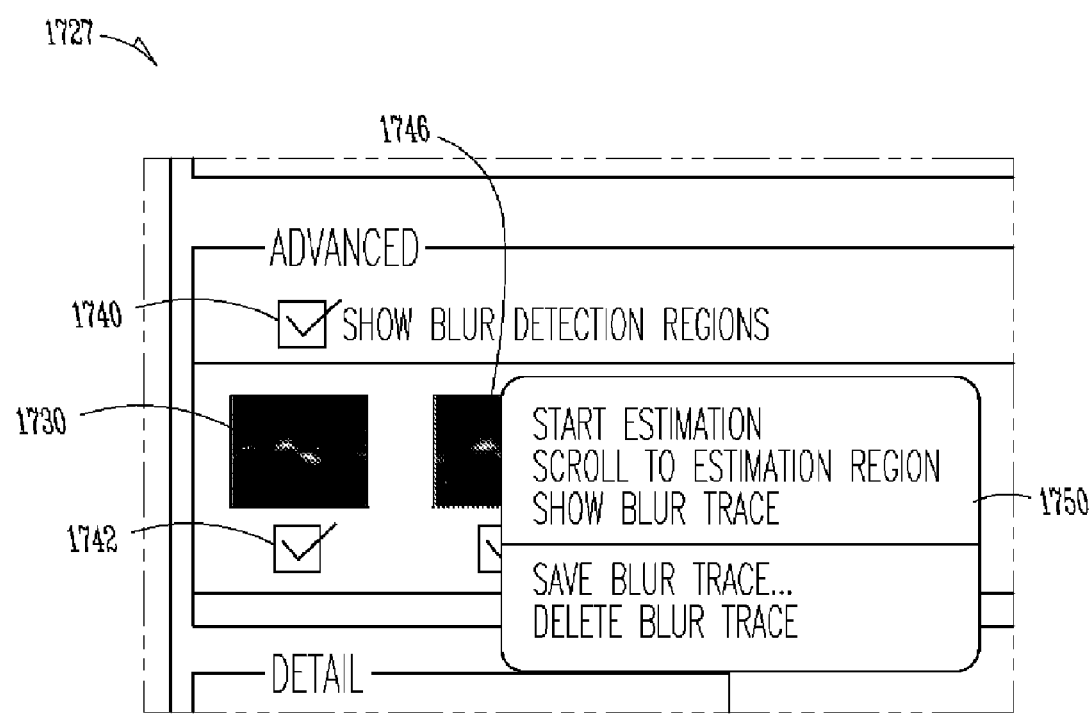

In some example embodiments, the GUI 1700 may provide controls used to zoom in or out of blur kernels at various levels of granularity. FIG. 20C shows an exploded view of the kernel zone 1727 where a user has activated an option menu 1750 (e.g., using a right-click function on a mouse or any gesture). The example option menu 1750 is shown to include functions including "Start Estimation," "Scroll to Estimation Region," "Show Blur Trace on Image," "Save Blur Trace . . . " and "Delete Blur Trace." For example, when the "Show Blur Trace on Image" option is selected, a corresponding blur kernel image may be overlaid on the image. Various other functions associated with deblurring an image may be provided in other example embodiments.

As mentioned above, a plurality of blur kernels may be displayed in the control zone, each of the plurality of blur kernels being associated with a corresponding blurred region. Each of the plurality of blur kernels may then be displayed proximate its associated blurred region in the display zone.

In an example embodiment, the display zone (e.g., the display zone 1710) defines a preview canvas for displaying changes to a selected image (e.g., the blurred image 1715) responsive to changes in one or more blur kernel parameters (e.g., using functionality provided in the control zone 1720). The GUI 1700 may also provide functionality to allow a user to define or input kernel parameters. These parameters may allow a user to modify at least one parameter of the blur kernel. An example of such an input is the size of the blur kernel, and the image in the display zone may then be modified in response to a variation in the at least one parameter.

As mentioned above, displaying the suggested blur kernel proximate the associated region may comprise overlaying a blur kernel on the blurred region (e.g., the blurred region 1716 of the blurred image 1715). FIG. 21 is a GUI 2100, in accordance with an example embodiment, illustrating an overlay of a blur kernel 2110 on an associated image. The GUI 2100 may display the blur kernel 2110 within the display zone with the same zoom level of the display zone 1710, which provides information as to the relative size between the blur kernel 2110 and the blurred region (e.g., the blurred region 1716) in the blurred image 1715. A user may be able to zoom in or out on the blur kernel 2110 at arbitrary levels. Also, the blur kernel 2110 or blur trace is generally similar to the blur within the image 1715, and displaying the blur kernel 2110 proximate to the image 1715 may enable the user to review the quality of the kernel estimation with respect to the image 1715.

Figure 22:
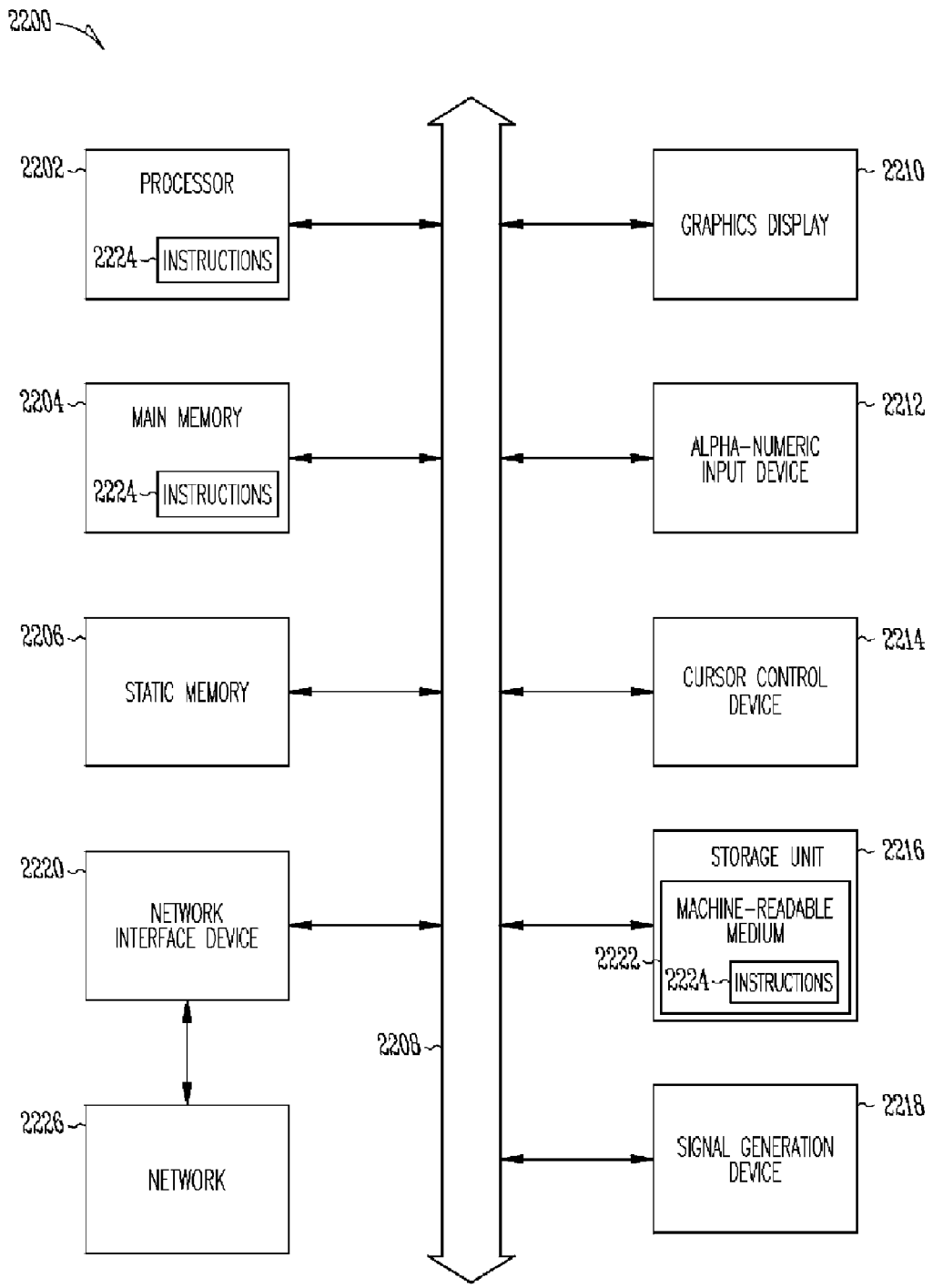
FIG. 22 is a block diagram illustrating components of a machine, according to some example embodiments, configured to read instructions from a machine-readable medium and perform any one or more of the methodologies described herein.

FIG. 22 is a block diagram illustrating components of a machine 2200, according to some example embodiments, able to read instructions from a machine-readable medium (e.g., a machine-readable storage medium) and perform any one or more of the methodologies discussed herein, in whole or in part. Specifically, FIG. 22 shows a diagrammatic representation of the machine 2200 in the example form of a computer system and within which instructions 2224 (e.g., software, a program, an application, an applet, an app, or other executable code) for causing the machine 2200 to perform any one or more of the methodologies discussed herein may be executed. In alternative embodiments, the machine 2200 operates as a stand-alone device or may be connected (e.g., networked) to other machines. In a networked deployment, the machine 2200 may operate in the capacity of a server machine or a client machine in a server-client network environment, or as a peer machine in a peer-to-peer (or distributed) network environment. The machine 2200 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 2224, sequentially or otherwise, that specify actions to be taken by that machine. Further, while only a single machine is illustrated, the term "machine" shall also be taken to include a collection of machines that individually or jointly execute the instructions 2224 to perform any one or more of the methodologies discussed herein.

The machine 2200 includes a processor 2202 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 2204, and a static memory 2206, which are configured to communicate with each other via a bus 2208. The machine 2200 may further include a graphics display 2210 (e.g., a plasma display panel (PDP), a light emitting diode (LED) display, a liquid crystal display (LCD), a projector, or a cathode ray tube (CRT)). The machine 2200 may also include an alphanumeric input device 2212 (e.g., a keyboard), a cursor control device 2214 (e.g., a mouse, a touchpad, a trackball, a joystick, a motion sensor, or other pointing instrument), a storage unit 2216, a signal generation device 2218 (e.g., a speaker), and a network interface device 2220.

The storage unit 2216 includes a machine-readable medium 2222 on which is stored the instructions 2224 embodying any one or more of the methodologies or functions described herein. The instructions 2224 may also reside, completely or at least partially, within the main memory 2204, within the processor 2202 (e.g., within the processor's cache memory), or both, during execution thereof by the machine 2200. Accordingly, the main memory 2204 and the processor 2202 may be considered as machine-readable media. The instructions 2224 may be transmitted or received over a network 2226 (e.g., network 120 of FIG. 1) via the network interface device 2220.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 2222 or computer-readable medium is shown in an example embodiment to be a single medium, the term "machine-readable medium" or "computer-readable medium" should be taken to include a single medium or multiple media (e.g., a centralized or distributed database, or associated caches and servers) able to store instructions 2224. The term "machine-readable medium" or "computer-readable medium" shall also be taken to include any medium, or combination of multiple media, that is capable of storing instructions (e.g., instructions 2224) for execution by a machine or computer (e.g., machine 2200), such that the instructions, when executed by one or more processors of the machine or computer (e.g., processor 2202), cause the machine or computer to perform any one or more of the methodologies described herein. Accordingly, a "machine-readable medium" refers to a single storage apparatus or device, as well as "cloud-based" storage systems or storage networks that include multiple storage apparatuses or devices. The term "machine-readable medium" shall accordingly be taken to include, but not be limited to, one or more data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some example embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a nonexclusive "or," unless specifically stated otherwise.

Of course, the functions described herein for any single machine, database, or device may be subdivided among multiple machines, databases, or devices. As used herein, a "database" is a data storage resource and may store data structured as a text file, a table, a spreadsheet, a relational database (e.g., an object-relational database), a triple store, a hierarchical data store, or any suitable combination thereof.

Having thus described the invention, what is claimed is:

1. A computerized system for deblurring an image having spatially varying blur, the system comprising:
    a blur kernel sizing engine comprising an image module and a blur kernel sizing module,
    wherein the image module is configured to:
        access, utilizing one or more processors, the image in memory having two or more blurred regions, and
    wherein the blur kernel sizing module is configured to:
        determine, utilizing the one or more processors, a first value for a first size of a blur kernel for each of the two or more blurred regions employing a first sizing estimator,
        determine, utilizing the one or more processors, a second value for a second size of the blur kernel for each of the two or more blurred regions employing a second sizing estimator, and
        determine, for each of the two or more blurred regions, utilizing the one or more processors, an appropriate size of the blur kernel to be used when deblurring the blurred region of the image, wherein determining the appropriate size utilizes blur kernel boundaries based on at least the first size and the second size of the blur kernel for the blurred region.

2. The system of claim 1, wherein the first sizing estimator is an autocorrelation-based size estimator.

3. The system of claim 2, wherein the autocorrelation-based size estimator is configured to:
    calculate at least one derivative for the blurred region of the accessed image;
    determine an autocorrelation map for the at least one derivative;
    apply a threshold filter to the autocorrelation map; and measure connected components in the autocorrelation map to estimate or determine the first value for the first size of the blur kernel for the blurred region.

4. The system of claim 1, wherein the second sizing estimator is a latent image-based size estimator.

5. The system of claim 4, wherein the latent image-based size estimator is configured to:
determine an estimated latent image for the accessed image,
estimate the blur kernel from the estimated latent image,
measure nonzero elements of the estimated blur kernel to determine the second value for the second size of the blur kernel for the blurred region.

6. The system of claim 1, wherein the blur kernel sizing engine is further configured to receive a user input that identifies an additional estimated size for the blur kernel for each of the two or more blurred regions, such that the appropriate size of the blur kernels to be used when deblurring the image further utilizes additional blur kernel boundaries based on the additional estimated sizes of the blur kernel for the blurred region.

7. The system of claim 6, wherein the image module is further configured to preprocess the blurred image by downsampling the image based on the received input identifying the additional estimated sizes for the blur kernels for the blurred regions, so as to reduce computational time associated with the blur kernel sizing module.

8. The system of claim 1, wherein the blur kernel sizing engine is configured to employ the first sizing estimator to estimate a lower value of the size of the blur kernel for each of the two or more blurred regions, and employ the second sizing estimator to estimate a higher value of the size of the blur kernel for each of the two or more blurred regions.

9. The system of claim 1, wherein the appropriate sizes of the blur kernels to be used when deblurring the image is determined based on a selection criteria.

10. The system of claim 1, further comprising:
a region suggestion engine configured to identify, utilizing the one or more processors, multiple suitable regions in the blurred image for blur kernel estimation based on whether any of the identified multiple suitable regions overlap by more than a reference amount;
an image deblurring engine configured to reduce, utilizing the one or more processors, spatially varying blur by deconvolving each of the two or more blurred regions with their respective blur kernels each being sized by the blur kernel sizing module.

11. A computer-implemented method for deblurring an image having spatially varying blur, the method comprising:
accessing the image having two or more blurred regions;
determining a first value for a first size of a blur kernel for each of the two or more blurred regions based on a first sizing estimate;
determining a second value for a second size of the blur kernel for each of the two or more blurred regions based on a second sizing estimate;
determining, for each of the two or more blurred regions, an appropriate size of the blur kernel to be used for deblurring the blurred region of the image, wherein determining the appropriate size utilizes blur kernel boundaries based on at least the first sizing estimate and the second sizing estimate of the blur kernel for the blurred region; and
deconvolving each of the two or more blurred regions based on their determined appropriate sizes.

12. The computer-implemented method of claim 11, wherein the first sizing estimate is determined by:
calculating at least one derivative for the blurred region of the accessed image;
determining an autocorrelation map for the at least one derivative;
applying a threshold filter to the autocorrelation map; and
measuring connected components in the autocorrelation map to estimate or determine the first value for the first size of the blur kernel for the blurred region.

13. The computer-implemented method of claim 11, wherein the second sizing estimate is determined by:
determining an estimated latent image for the accessed image;
estimating the blur kernel from the estimated latent image; and
measuring nonzero elements of the estimated blur kernel to determine the second value for the second size of the blur kernel for the blurred region.

14. The computer-implemented method of claim 11, wherein the first sizing estimate is a lower value of the size of the blur kernel for each of the two or more blurred regions, and the second sizing estimate is a higher value of the size of the blur kernel for each of the two or more blurred regions.

15. The computer-implemented method of claim 11, further comprising:
receiving a user input that identifies an additional estimated size for the blur kernel for each of the two or more blurred regions, such that the appropriate size of the blur kernels to be used when deblurring the image further utilizes additional blur kernel boundaries based on the additional estimated sizes of the blur kernel for the blurred region.

16. A non-transitory computer storage medium storing computer-usable instructions that, when used by one or more computing devices, cause the one or more computing devices to perform operations comprising:
accessing the image having two or more blurred regions;
determining a first value for a first size of a blur kernel for each of the two or more blurred regions based on a first sizing estimate;
determining a second value for a second size of the blur kernel for each of the two or more blurred regions based on a second sizing estimate;
determining, for each of the two or more blurred regions, an appropriate size of the blur kernel to be used for deblurring the blurred regions of the image, wherein determining the appropriate size utilizes blur kernel boundaries based on at least the first sizing estimate and the second sizing estimate of the blur kernel for the blurred region; and
deconvolving each of the two or more blurred regions based on their determined appropriate sizes.

17. The medium of claim 16, wherein the first sizing estimate is determined by:
calculating at least one derivative for the blurred regions of the accessed image;
determining an autocorrelation map for the at least one derivative;
applying a threshold filter to the autocorrelation map; and
measuring connected components in the autocorrelation map to estimate or determine the first value for the first size of the blur kernel for the blurred region.

18. The medium of claim 16, wherein the second sizing estimate is determined by:
determining an estimated latent image for the second accessed image;

estimating the blur kernel from the estimated latent image; and measuring nonzero elements of the estimated blur kernel to determine the second value for the second size of the blur kernel for the blurred region.

19. The medium of claim 16, wherein the first sizing estimate is a lower value of the size of the blur kernel for each of the two or more blurred regions, and the second sizing estimate is a higher value of the size of the blur kernel for each of the two or more blurred regions.

20. The medium of claim 16, the operations further comprising:

receiving a user input that identifies an additional estimated size for the blur kernel for each of the two or more blurred regions, such that the appropriate size of the blur kernels to be used when deblurring the image further utilizes additional blur kernel boundaries based on the additional estimated sizes of the blur kernel for the blurred region.

\* \* \* \* \*